(12) United States Patent
Lipovetskaya et al.

(10) Patent No.: US 8,049,954 B2
(45) Date of Patent: Nov. 1, 2011

(54) COLOR ROTATING ELEMENT DISPLAYS

(75) Inventors: Yelena Lipovetskaya, Santa Barbara, CA (US); Brian Gobrogge, Grand Rapids, MI (US)

(73) Assignee: Cospheric LLC, Santa Barbara, CA (US)

( * ) Notice: Subject to any disclaimer, the term of this patent is extended or adjusted under 35 U.S.C. 154(b) by 43 days.

(21) Appl. No.: 12/790,590

(22) Filed: May 28, 2010

(65) Prior Publication Data

US 2010/0309543 A1 Dec. 9, 2010

Related U.S. Application Data

(60) Provisional application No. 61/184,600, filed on Jun. 5, 2009.

(51) Int. Cl.
*G02B 26/00* (2006.01)
*G02F 1/03* (2006.01)
*G09G 3/34* (2006.01)
*G03G 13/00* (2006.01)

(52) U.S. Cl. ........... 359/296; 359/245; 345/107; 430/31

(58) Field of Classification Search .................. 359/296, 359/245, 253–254, 265, 290–291; 349/33; 345/107; 430/31–32
See application file for complete search history.

(56) References Cited

U.S. PATENT DOCUMENTS

| | | |
|---|---|---|
| 4,126,854 A | 11/1978 | Sheridon |
| 4,143,103 A | 3/1979 | Sheridon |
| 4,261,653 A | 4/1981 | Goodrich |
| 4,438,160 A | 3/1984 | Ishikawa et al. |
| 4,810,431 A | 3/1989 | Leidner |
| 5,344,594 A | 9/1994 | Sheridon |
| 5,708,525 A | 1/1998 | Sheridon |
| 5,737,115 A | 4/1998 | Mackinlay et al. |
| 5,751,268 A * | 5/1998 | Sheridon ...................... 345/107 |
| 5,754,332 A | 5/1998 | Crowley |
| 5,760,761 A | 6/1998 | Sheridon |

(Continued)

FOREIGN PATENT DOCUMENTS

EP 0 935 230 8/1999

(Continued)

OTHER PUBLICATIONS

International Search Report and Written Opinion mailed on Apr. 17, 2008 for PCT/US2007/080842.

(Continued)

*Primary Examiner* — Dawayne Pinkney
(74) *Attorney, Agent, or Firm* — Weaver Austin Villeneuve & Sampson LLP

(57) ABSTRACT

A rotating element display includes a matrix having discrete regions of cells of different sizes occupied by rotatably disposed optically and electrically anisotropic elements (e.g., electrically anisotropic bichromal spheres). The regions of larger cells are occupied by larger rotating elements having a first combination of optical properties while the regions of smaller cells are occupied by smaller elements having a second combination of optical properties. The rotating elements having different combinations of optical properties are separately addressable by electromagnetic signals that cause rotation of selected optically dissimilar elements and create a desired color image. In a different aspect, a rotating element display includes a plurality of optically anisotropic rotatable elements occupying cells of a transparent matrix, in a configuration where a background color is viewable through the matrix. A color image is created using a combination of background color with optical properties of the rotating elements.

20 Claims, 17 Drawing Sheets

U.S. PATENT DOCUMENTS

| | | | |
|---|---|---|---|
| 5,767,826 | A | 6/1998 | Sheridon et al. |
| 5,777,782 | A | 7/1998 | Sheridon |
| 5,808,783 | A | 9/1998 | Crowley |
| 5,815,306 | A | 9/1998 | Sheridon et al. |
| 5,892,497 | A | 4/1999 | Robertson |
| 5,914,805 | A | 6/1999 | Crowley |
| 5,917,646 | A | 6/1999 | Sheridon |
| 5,930,026 | A | 7/1999 | Jacobson et al. |
| 5,982,346 | A | 11/1999 | Sheridon et al. |
| 5,989,629 | A | 11/1999 | Sacripante et al. |
| 6,054,071 | A | 4/2000 | Mikkelsen, Jr. |
| 6,055,091 | A | 4/2000 | Sheridon et al. |
| 6,067,185 | A | 5/2000 | Albert et al. |
| 6,162,321 | A | 12/2000 | Silverman |
| 6,222,513 | B1 | 4/2001 | Howard et al. |
| 6,379,856 | B2 | 4/2002 | Sokol et al. |
| 6,428,868 | B1 | 8/2002 | Sheridon et al. |
| 6,441,946 | B1 | 8/2002 | Sheridon |
| 6,445,490 | B1 | 9/2002 | Chopra et al. |
| 6,459,200 | B1 | 10/2002 | Moore |
| 6,462,859 | B1 | 10/2002 | Bastiaens et al. |
| 6,487,002 | B1 | 11/2002 | Biegelsen |
| 6,498,674 | B1 | 12/2002 | Sheridon |
| 6,577,432 | B2 | 6/2003 | Engler et al. |
| 6,672,921 | B1 | 1/2004 | Liang et al. |
| 6,693,620 | B1 | 2/2004 | Herb et al. |
| 6,727,881 | B1 | 4/2004 | Albert et al. |
| 6,750,844 | B2 | 6/2004 | Nakanishi |
| 6,788,452 | B2 | 9/2004 | Liang et al. |
| 6,795,229 | B2 | 9/2004 | Liang et al. |
| 6,839,158 | B2 | 1/2005 | Albert et al. |
| 6,850,355 | B2 | 2/2005 | Liang et al. |
| 6,956,690 | B2 | 10/2005 | Yu et al. |
| 6,970,154 | B2 | 11/2005 | Sheridon |
| 6,987,603 | B2 | 1/2006 | Paolini, Jr. et al. |
| 7,017,895 | B2 | 3/2006 | Sakamoto |
| 7,057,599 | B2 | 6/2006 | Engler et al. |
| 7,071,895 | B2 | 7/2006 | Wampler |
| 7,075,502 | B1 | 7/2006 | Drzaic et al. |
| 7,116,466 | B2 | 10/2006 | Whitesides et al. |
| 7,167,155 | B1 | 1/2007 | Albert et al. |
| 7,177,067 | B1 | 2/2007 | Sakamoto |
| 7,184,197 | B2 | 2/2007 | Liang et al. |
| 7,271,947 | B2 | 9/2007 | Liang et al. |
| 7,312,916 | B2 | 12/2007 | Pullen et al. |
| 7,369,299 | B2 | 5/2008 | Sakurai et al. |
| 2002/0106847 | A1 | 8/2002 | Kazlas et al. |
| 2002/0140133 | A1 | 10/2002 | Moore |
| 2004/0179146 | A1 | 9/2004 | Nilsson |
| 2006/0050363 | A1 | 3/2006 | Chopra et al. |
| 2008/0100907 | A1 | 5/2008 | Lipovetskaya et al. |
| 2009/0231251 | A1 | 9/2009 | Shoji |
| 2010/0035377 | A1 | 2/2010 | Gobrogge et al. |
| 2010/0097687 | A1 | 4/2010 | Lipovetskaya et al. |

FOREIGN PATENT DOCUMENTS

| | | |
|---|---|---|
| WO | 02/29585 | 4/2002 |
| WO | 2008/045891 | 4/2008 |
| WO | 2008/080066 | 7/2008 |

OTHER PUBLICATIONS

International Search Report, 5 pages and Written Opinion, 6 pages, mailed May 15, 2008, filed on Dec. 21, 2007 for PCT/US2007/088567.

Lipovetskaya et al., U.S. Appl. No. 12/004,746, entitled "Hemispherical Coating Method for Micro-Elements", filed Dec. 21, 2007.

U.S. Office Action for U.S. Appl. No. 11/973,883, mailed Mar. 9, 2010.

U.S. Office Action for U.S. Appl. No. 12/579,271, mailed Jul. 14, 2010.

U.S. Office Action for U.S. Appl. No. 11/973,883, mailed Oct. 5, 2010.

US Provisional U.S. Appl. No. 60/850,883, filed Oct. 10, 2006, entitled "Electro-Optic Display".

US Provisional U.S. Appl. No. 60/876,767, filed Dec. 22, 2006, entitled "Hemispherical Coating Method for Micro-Elements".

US Provisional U.S. Appl. No. 61/184,600, filed Jun. 5, 2009, entitled "Color Rotating Element Displays".

US Provisional U.S. Appl. No. 61/107,605, filed Oct. 22, 2008, entitled "Rotating Element Transmissive Displays".

\* cited by examiner

SECTION A-A

DETAIL B
SCALE 1 : 10

DETAIL C
SCALE 1 : 10

COLOR ROTATING ELEMENT DISPLAYS

CROSS-REFERENCE TO RELATED APPLICATIONS

This application claims benefit of prior U.S. Provisional Application No. 61/184,600 filed Jun. 5, 2009, titled "Color Rotating Element Displays" naming Lipovetskaya et al. as inventors, which is herein incorporated by reference in its entirety and for all purposes.

FIELD OF THE INVENTION

The present invention relates to visual displays. Specifically, it relates to electro-optic displays that employ optically and electrically anisotropic rotating elements for generation of images. More specifically, it relates to color rotating element displays.

BACKGROUND OF THE INVENTION

Rotating element displays (REDs) are electro-optic displays that employ rotation of optically and electrically anisotropic elements to generate images. The first REDs were developed in the 1970s at Xerox's Palo Alto Research Center. These displays, often referred to as "gyricon" displays, rotating element displays, or twisting ball displays, are typically based on rotation of optically and electrically anisotropic spheres embedded in an elastomer. In one example of a rotating element display, each sphere is composed of negatively charged black wax or plastic on one side and positively charged white wax or plastic on the other side. Each sphere is suspended in a dielectric fluid contained within a cavity formed in a plasticized elastomer and is free to rotate in the fluid so that it could turn with black or white side to the viewer, thus providing a pixel with a black or white appearance. When an appropriate voltage is applied to the electrodes addressing selected spheres, the spheres rotate in accordance with their dipole moment and display an image to the viewer. Such devices have been described, for example, in U.S. Pat. Nos. 4,126,854 and 6,441,946 issued to Sheridon et al.

Rotating element displays are often referred to as electronic paper, because they can be fabricated in flexible form and can be used without backlight, just as ordinary paper. Rotating element technology, however, failed to produce image quality comparable to that of images printed on paper. In particular, such displays did not possess the high reflectance of white paper, therefore providing low-contrast images. Rotating element displays based on elastomer substrate also had limited environmental stability, because plasticized polymer was not capable of withstanding high-temperature or high-humidity conditions. Further, only few dielectric fluids were suitable for use in gyricon displays, since dielectric fluid in gyricon was serving both as a polymer plasticizer and as a rotation media and therefore had to possess properties suitable for both of these applications.

Rotating element displays are generally limited to black-and-white devices. While use of color filters in combination with gyricons was described, e.g., in U.S. Pat. No. 7,071,895 issued to Wampler, and in U.S. Pat. No. 5,815,306 issued to Sheridon et al., commercial use of such displays was limited due to manufacturing difficulties and due to low brightness and contrast of the resulting devices. Since black and white electrophoretic displays in general and gyricon displays in particular have limited brightness in the white state, adding a color filter on top of the display reduces the brightness of the display even further, creating a display with washed out colors and poor readability.

Other techniques for fabrication of color gyricon displays included the use of multi-segmented multi-colored spheres described in U.S. Pat. No. 5,760,761 issued to Sheridon et al., and the use of multi-layer gyricon stacks, where each layer of the stack is responsible for a specific color, as described in U.S. Pat. No. 6,162,321 issued to Silverman, U.S. Pat. No. 5,767,826 and U.S. Pat. No. 5,982,346 issued to Sheridon et al. The displays described in these references similarly suffered from manufacturing difficulties and were not successfully commercialized. Rotating element devices disclosed in these patents involve particles disposed in an elastomer substrate swelled by a plasticizer fluid, where the particles are disposed in random configuration resulting in poor packing density, lower brightness, contrast and saturation of colors in a device. In addition, the devices described in these patents require complex manufacturing of small multi-segment rotating elements, combining transparent and colored regions.

SUMMARY

The major limitation of previously described multi-layer devices based on rotating elements is that the operating voltage required to drive these devices is too high for producing a cost-effective and commercially-viable device. Rotating elements respond to electromagnetic field which is created by applied voltage and is proportional to the thickness of the device. Therefore, it is important to keep the device thin to keep the operating voltage low. Multi-layer approach results in rotating element display that is too thick and in operating voltage that is too high for successful commercialization. In a preferred embodiment, the present invention provides color rotating element displays, in which the rotatable elements are arranged in a monolayer, resulting in a thin display that can be driven by small applied voltages.

The present invention provides several new types of color REDs which in many embodiments possess high brightness, contrast, and saturation, can be cost-effectively manufactured and can operate at acceptable voltage. Both multi-color REDs and two-color REDs are provided. Displays having more than two colors but less than full color spectrum can also be manufactured using methods provided herein.

The present invention discloses four new types of multi-color rotating element displays. In some embodiments the displays are based on combining distinct sets of two-color microspheres, also known as bichromal microspheres, where each microsphere is composed of two hemispheres that are electrically and optically anisotropic. These distinct sets of microspheres vary not only in optical properties but also in how they respond to electromagnetic field, allowing manufacturing of a device with unique functionality of multi-color effects without the use of complex electronics. In some embodiments, the sets of bichromal microspheres of different particle size are combined. The present invention uses bichromal microspheres in new ways in conjunction with new techniques to provide lower-cost reflective displays with multi-color effects capability.

Provided displays make use of a container matrix that comprises a plurality of cells configured for housing rotating elements (e.g., one element per cell), such that an ordered array of rotating elements in a tightly packed monolayer arrangement is created. The container matrix can be manufactured by known techniques, e.g., by hot embossing, and can then be populated by rotating elements, sealed, and filled with dielectric fluid, to provide a front plane of an RED structure. Arranging rotating elements in a tightly packed monolayer, as opposed to elastomer substrate, significantly simplifies manufacturing, improves brightness and lowers operating voltage of the device.

Four separately usable types of color REDs that employ a container matrix are described herein: Multi-Color REDs, Optically-Dimensionally Matched Color REDs, Background-Assisted Color REDs, and Matrix-Assisted Color REDs with Color Filters. In some embodiments, these color REDs make use of combinations of distinct sets of bichromal microspheres, which respond differently to electromagnetic field.

One type of color displays provided herein is Multi-Color RED. This device uses distinct sets of rotatable elements that differ in optical characteristics and respond differently to electromagnetic field. The rotatable elements in this embodiment may all have substantially the same size, or distinct sets of different-size elements may be employed.

In one aspect, a multi-color rotating element display comprises: (a) a back plane comprising a plurality of electrodes distributed in two dimensions on the backplane, wherein each electrode allows control of a discrete region of the display; and (b) a front plane comprising: a first side connected to or proximate said back plane; at least one electrode on a second side of the front plane opposite said back plane; a matrix comprising a plurality of cells in a tightly packed monolayer arrangement; a plurality of rotatable elements disposed in the matrix cells, wherein the rotatable elements are of more than one type, and wherein rotatable elements of a first type have optical properties and electromagnetic response properties that are distinct from optical properties and electromagnetic response properties of rotatable elements of the second type; and a fluid provided in said cells, such that said elements can rotate from a first orientation to a second orientation within their respective cells when an electromagnetic field is applied to the cells.

In some embodiments the rotatable elements are hemispherically coated spheres, wherein the rotatable elements of different types comprise cores made of glass, polymer or ceramic. In some embodiments, the coatings used for the hemispherically coated elements impart optical and electrical anisotropy to the rotatable elements. In some embodiments, each type of the rotatable elements comprises a hemisphere having a white color. Preferably, the viewable portions of the matrix containing the rotatable elements are white, which can significantly improve the brightness of the display.

In some embodiments multi-color displays are manufactured by combining red-and-white, blue-and-white, black-and-white, and yellow-and-white spheres that vary in their response to electromagnetic field, and arranging them as a tightly packed monolayer in a suitable containment structure, typically holding one element per cell. Color images are created by addressing regions occupied by rotating elements causing selected elements to rotate and display the required color. In some embodiments, three- and four-color displays are provided using rotating elements of two types. In other embodiments, more types of rotating elements can be combined to create a wider color gamut.

In another aspect, a method of using a Multi-color RED described above is provided. The method comprises, in one embodiment, providing a plurality of signals to at least some of the electrodes of the display to thereby create a potential difference between the electrodes in response to the signals; and rotating at least some of the optically anisotropic elements from a first orientation to a second orientation in response to the potential difference, wherein rotation of elements of the first type and rotation of elements of the second type is addressably controlled. This method can similarly be used for addressing elements of third, fourth and fifth type. This method can similarly used for other types of color REDs described here.

In a separate aspect of this invention, color REDs are manufactured using Optical-Dimensional Matching. In this aspect an RED includes a front plane which comprises several types of bichromal rotating elements that vary in size, as well as in optical and/or electromagnetic properties. Said front-plane also includes a container matrix having cells which are configured for hosting the rotating elements, typically one element per cell. The matrix has discrete alternating regions of cells having different sizes. For example the matrix can include several rows of larger cells, followed by several rows of smaller cells, followed again by several rows of larger cells, etc. The larger cells are occupied by larger rotating elements having a first combination of optical properties (e.g., black-and-white spheres), while smaller cells are occupied by smaller elements having a second combination of optical properties (e.g., red-and-white spheres). The rotating elements having different optical properties may be separately addressable, e.g., by individual electrodes controlling discrete regions of the display. Alternatively, rotating elements of different optical properties may be controlled by applying different electromagnetic signals and do not require individual electrodes. Color images are created by addressing discrete regions occupied by optically different elements causing selected elements to rotate and display the required color. In some embodiments, three- and four-color displays are provided using optically anisotropic elements of two types. In other embodiments, Optical-Dimensional Matching can be used in conjunction with more than two optically distinct elements. For example, in some embodiments multi-color displays are manufactured by combining red-and-white, blue-and-white, black-and-white, and yellow-and-white spheres possibly having different sizes with an appropriately configured matrix having alternating regions of different-size cells. In the preferred embodiment of this aspect of the invention both sides of the rotating elements are optically opaque, providing a reflective multi-color display. In some applications, it may be advantageous to use transmissive particles.

Optically-Dimentionally Matched RED can incorporate types of rotating elements that differ only in size and optical characteristics, or alternatively, rotating elements can also vary in their electromagnetic characteristics (i.e. response to electromagnetic field) as described in Multi-Color RED embodiment.

In one embodiment, an Optically-Dimensionally Matched RED comprises: (a) a backplane comprising a plurality of electrodes distributed in two dimensions on the backplane, wherein each electrode allows control of a discrete region of the display; and (b) a front plane comprising a first side connected to or proximate to the backplane; at least one electrode on a second side of the front plane opposite the backplane; a matrix comprising a plurality of cells, wherein the plurality of cells comprise a plurality of cells of a first type and a plurality of cells of a second type, wherein cells of the first type are smaller than the cells of the second type; a plurality of optically anisotropic elements comprising a plurality of elements of a first type and a plurality of elements of a second type disposed in the plurality of cells such that the optically anisotropic elements of the first type occupy essentially only cells of the first type and the optically anisotropic elements of the second type occupy only cells of the second type, wherein optically anisotropic elements of the first type are smaller than the optically anisotropic elements of the second type. The front plane further comprises a fluid provided in the cells, allowing the elements to rotate from a first orientation to a second orientation within their respective cells when an electromagnetic field is applied to the cells.

Advantageously, because of facile size-matching between the rotating elements and the cells of the matrix, the described display can be easily manufactured using pre-formed optically anisotropic elements of different sizes and a pre-formed matrix having regions of different-size cells configured to host the optically anisotropic elements of matching sizes.

In one embodiment the method of assembling a front plane of an Optically-Dimensionally Matched RED comprises: providing a matrix comprising (i) a support surface; (ii) a plurality of cells on the support surface in the matrix, wherein the plurality of cells comprise a plurality of cells of a first type and a plurality of cells of a second type, wherein cells of the first type are smaller than the cells of the second type; and providing a plurality of optically anisotropic elements comprising a plurality of elements of a first type and a plurality of elements of a second type, where the elements of the first type are smaller than the elements of the second type, and wherein elements of the second type do not physically fit into the matrix cells of the first type. The method of assembling involves disposing the plurality of optically anisotropic elements of the second type in the plurality of cells of the second type; and, after the larger elements of the second type have been disposed within the cells of the second type, disposing the plurality of smaller optically anisotropic elements of the first type in the plurality of cells of the first type. The method further involves providing at least one electrode on a side of the matrix opposite the support surface of the matrix; and providing a dielectric fluid into the plurality of matrix cells, whereby in the front plane produced by described method the elements can rotate from a first orientation to a second orientation within their respective cells when an electromagnetic field is applied to the cells. Similarly, combinations of two, three, four, or five types of rotating elements can be utilized to achieve more colors in a device.

Another type of color RED provided herein is a Background-Assisted RED. The Background-Assisted RED uses a combination of optical properties of a background color member (e.g., a colored film residing behind transparent container matrix) and of optically anisotropic elements residing in the cells of the transparent container matrix. For example, a blue background member residing behind the transparent container matrix, wherein the matrix hosts black-and-white rotatable spheres, will provide a visual appearance of a blue-and-white display.

In some embodiments, the Background-Assisted RED comprises: (a) a back plane comprising a plurality of electrodes distributed in two dimensions on the back plane, wherein each electrode allows control of a discrete region of the display; and (b) a front plane. The front plane comprises a first side connected to or proximate to the back plane; at least one background color member adjacent the first side of the front plane, where the background color member has a background color on its viewable side; at least one electrode on a second side of the front plane opposite the backplane; a transparent matrix comprising a plurality of cells in the matrix, wherein the matrix permits the background color member to be viewable through its transparent walls; a plurality of optically anisotropic elements disposed in the plurality, of matrix cells; and a fluid provided in the cells, allowing the elements to rotate from a first orientation to a second orientation within their respective cells when an electromagnetic field is applied to the cells.

In some embodiments, the Background-Assisted RED is manufactured as a two-color RED, in which a relatively large background member occupies essentially the entire area of the display or a macroscopic region of the display having an area of at least about 1 cm$^2$. In other embodiments, a multi-color Background-Assisted RED is provided in which discrete regions of small optically-dissimilar background members alternate over the display area. For example alternating regions of red, green, and blue background members, residing behind separately addressable regions of rotating elements, can be used to create a multi-color Background-Assisted display.

In a separate aspect, a Matrix-Assisted Color RED with Color Filters is provided. In this aspect, a container matrix, which has high optical reflectance on the viewable surface (e.g., a white matrix) is used in combination with color filters (e.g., transmissive colored films) placed over the viewable surface of the display, to provide a brighter higher-contrast appearance to the color image, compared to color rotating element devices disclosed in prior art. The Matrix-Assisted Color RED with Color Filters, in some embodiments, is manufactured as a two-color display with one color filter residing over essentially the entire surface of the display. In other embodiments, a full-color Matrix-Assisted RED with Color Filters is provided in which discrete alternating regions of small, optically-dissimilar color filters are provided for each pixel. For example alternating regions of red, green, and blue color filters, residing over separately addressable regions of rotating elements, can be used to create a full-color RGB display.

In some embodiments, the Matrix-Assisted RED with Color Filters comprises: (a) a back plane comprising a plurality of electrodes distributed in two dimensions on the back plane, wherein each electrode allows control of a discrete region of the display; and (b) a front plane. The front plane comprises a first side connected to or proximate to the back plane; at least one electrode on a second side of the front plane opposite the backplane; at least one color filter proximate the electrode on the second side of the front plane; an opaque light matrix comprising a plurality of cells in the matrix, wherein the light matrix is viewable through the at least one color filter; a plurality of optically anisotropic elements disposed in the plurality of matrix cells; and a fluid provided in the cells, such that the elements can rotate from a first orientation to a second orientation within their respective cells when an electromagnetic field is applied to the cells.

All four types of color REDs described can be used independently or in combination as needed to achieve desired color effects in a device.

These and other features and advantages of the invention will be described in more detail below with reference to the associated drawings.

Figure 1:
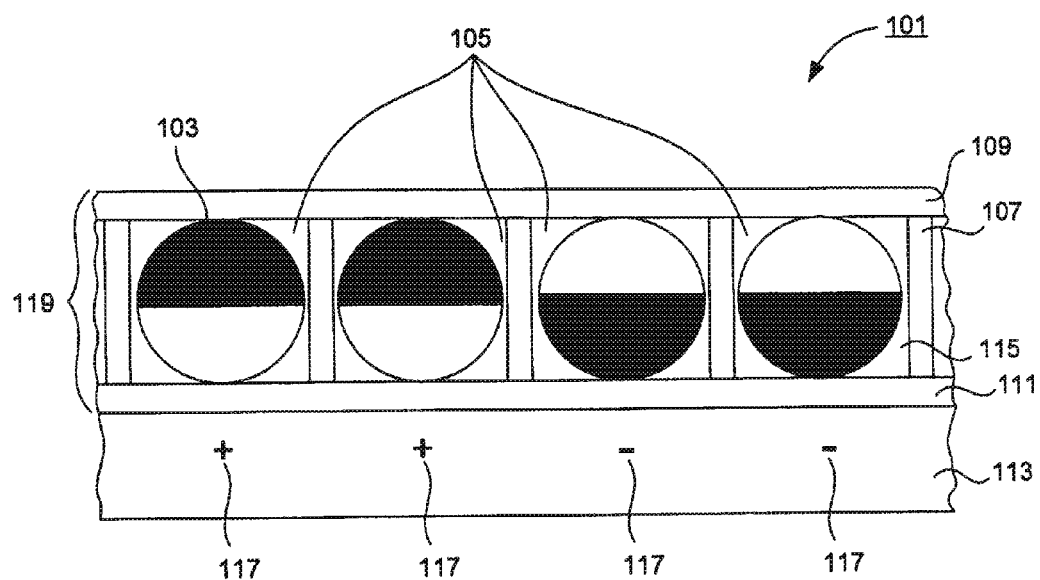
FIG. 1 illustrates a cross-sectional side view of a rotating element display comprising a container matrix.

It is understood that drawings are used for illustration purposes, and that the invention is not limited to particular dimensions shown.

DETAILED DESCRIPTION OF A PREFERRED EMBODIMENT

Color rotating element displays provided herein can be used for a wide variety of applications, including e-books, cell phones and other portable electronics, signage, rigid flat-panel display screens, billboards, color-changing fabrics, specialty films and other applications. In some embodiments, color rotating element displays can be written on and erased, as well as can retain information for a long period of time in the absence of an electric field or other external retaining force. In some embodiments, provided electronic paper displays are preferably thin, lightweight, and durable which allows them to be rolled or folded without the loss of information.

In some embodiments, provided displays of all four types make use of distinct sets of rotatable elements that respond differently to electromagnetic stimulus. For example, in some embodiments, elements with distinct optical properties will have matched and distinct responses to an electromagnetic stimulus. In one example, red-and-white bichromal spheres will respond to the electric field slower or will require higher voltage to start moving in electric field as compared to green-and-yellow bichromal spheres.

In some embodiments the distinct sets of rotatable elements will differ in size. For example a set of larger bichromal spheres having a first combination of optical properties (e.g., red-and-white) will be rotated at a higher voltage than a set of smaller bichromal spheres having a second combination of optical properties (e.g., blue-and-white).

In other embodiments, the distinct sets of rotatable elements will not differ in size, but will still possess different responses to electromagnetic stimulus. For example a set of heavier bichromal spheres having a first combination of optical properties (e.g., red-and-white) will be rotated at a higher voltage than a set of lighter bichromal spheres having a second combination of optical properties (e.g., blue-and-white), even if both are of the same size.

In other embodiments, the distinct sets of rotatable elements will differ in optical properties and size, but all sets of elements may have substantially similar response to electromagnetic field.

In other embodiments, the rotatable elements will comprise coatings which will impart distinct electromagnetic properties to distinct sets of elements, such that each set of elements will have a distinct response to a specific electromagnetic stimulus. This can allow different types of rotatable elements to be driven by one backplane electrode, configured to supply different electromagnetic stimuli.

It is understood that in some Background-Assisted REDs and in some Matrix-Assisted REDs with Color Filters, rotatable elements that will not differ in their response to distinct electromagnetic stimuli, may be employed. For example, identical bichromal spheres can be used. However, a display utilizing identical microspheres or sets of microspheres that differ only in optical characteristics, but do not differ in their response to electromagnetic field, requires a rather complex electronics to drive it. Specifically, each pixel of the device would need to be independently addressed, and, therefore, would require independent electrodes and electronic circuits to activate them. While Background-Assisted REDs and Matrix-Assisted REDs with Color Filters can, in general, use spheres that have identical or non-identical responses to electromagnetic stimulus, in some embodiments, utilization of distinct sets of spheres with distinct responses to electromagnetic stimuli, is preferred.

Utilizing sets of microspheres that vary in electromagnetic response in addition to their optical characteristics enables the device to display multiple color effects using fewer electrodes by controlling rotation of each type of microspheres independently with, for example, different frequency or voltage waveform. In the disclosed REDs, one electrode can control more than one color pixel.

Introduction and Overview

Four main types of color REDs are herein provided.

The first color RED type will be referred to as Multi Color RED. This device utilizes combination of several sets of bi-color rotating elements that differ in optical characteristics and in electromagnetic response. For example, RED of this type might combine red-and-white, green-and-white, and blue-and-white spheres, each set of microspheres with a unique response to electromagnetic field. Utilizing sets of microspheres that vary in electromagnetic response in addition to their optical characteristics enables the device to display color images using fewer electrodes and electronic circuits by controlling rotation of each type of microspheres independently with, for example, different frequency or voltage waveform.

The second type of color REDs is Optically-Dimensionally Matched RED, which in some embodiments (although not necessarily), is a specific subtype of the Multi Color RED.

This RED utilizes a specially designed container matrix having dimensionally dissimilar cells to house optically and dimensionally dissimilar rotatable elements in a pre-determined array. For example, a region of a matrix having larger cells may be populated by larger rotatable elements having a first combination of optical properties (e.g., red-and-white spheres), while a region of a matrix having smaller cells may be populated by smaller rotatable elements having a different combination of optical properties (e.g., black- and white spheres). The regions may alternate and thereby provide alternating groups of optically dissimilar rotatable elements in the front plane of the display. The distribution of optically dissimilar elements in this display is governed by the distribution of different-size cells in the pre-formed matrix, and is, therefore, pre-determined by the matrix design. Accordingly, optically dissimilar elements in this display reside at known, pre-determined locations, and can be reliably addressed by the electrodes distributed on the backplane of the display. The distinct sets of rotatable elements in this display, may have distinct matched responses to electromagnetic stimuli in some embodiments. In other embodiments, all sets of elements may respond substantially similarly.

The third type of color REDs, referred to as Background-Assisted RED, utilizes optical properties of visible portions of RED background in concert with optical properties of rotatable elements to provide a visual effect. This type of RED typically employs a clear transparent container matrix, which renders the background color visible to the viewer. It was discovered that background color interacts with rotating-element colors in an unexpected fashion, such that an interesting visual effect is observed. For example, placing a blue background film behind a clear matrix that holds black-and-white spheres will provide a display having substantially a blue-and-white appearance. Multi-color Background-Assisted displays having more than two colors (e.g., displays utilizing red, green, and blue color mixing) can be obtained by providing alternating regions of different-color background members disposed behind a clear matrix. In some embodiments the background member may include an image or a pattern, or, an image can be formed by multiple background members of such display. In some embodiments, rotatable elements of such diplay will include sets of elements that respond differently to electromagnetic stimuli, in order to facilitate driving of such display. In other embodiments, the response to electromagnetic stimuli may be substantially the same for all elements (e.g., identical bichromal microspheres may be used).

Finally, the fourth type of color REDs utilizes color filters disposed on a viewable side of an ordered array of rotatable elements, where the rotatable elements are preferably close-packed in a white or light container matrix. This implementation will be referred to as Matrix-Assisted RED with Color Filters. Similarly, sets of spheres with distinct responses to electromagnetic stimuli may be used in this display, for achieving a simpler driving mechanism. In other embodiments, the spheres will not differ in their response to an electromagnetic stimulus.

While each display type will be described in detail in the following sections, a number of features and operating principles are common to all four display types, and will be described in this section. Unless specifically indicated, the operating principles generally described in this section are applicable to each type of color REDs.

The described REDs possess a number of advantageous properties, but it is understood that advantageous features listed herein need not be present in one display structure, and that the invention is not limited by the presence of described advantages.

The primary advantage of the present invention is that it addresses a major limitation in color display industry associated with the high cost of electronics required to produce a multi-color image in a typical display.

In a typical color diplay for every pixel there are three subpixels (usually red, green and blue) which are independently addressed with individual electrodes to create an image on the screen. Color REDs described in this invention, in particular Multi-Color REDs and Optically-Dimensionally Matched REDs, reduce the number of electrodes needed to produce a color image by enabling multiple colors to be addressed with a single electrode. For example, one electrode can be used to address red, green and blue subpixels with unique waveforms or pulse width modulation. This particular advantage of the disclosed REDs enables simpler, cost-effective displays with multi-color functionally.

In some embodiments, provided REDs have improved brightness and color saturation as compared to previously described color rotating element displays. Further, the REDs described herein can be manufactured more easily than rotating element displays of the prior art, and can possess high environmental stability, e.g. they can be subjected to high temperature and humidity without deterioration of display properties.

In some embodiments (but not necessarily) the displays may be fabricated in flexible form and may serve as electronic paper. In some embodiments the described displays are fully reflective, that is, they do not require backlight, and may need only ambient light for viewing. In other embodiments, display implementations with a backlight can be used. In some embodiments, the described displays are bistable, having an ability to retain an image in an absence of external electric input. In other embodiments, the displays may be implemented in a non-bistable form.

The color displays described herein can provide multi-color images, such as two-color images, three-color images, and multi-color images. In some embodiments two-color displays, such as blue-and-white, red-and-white, and green-and-white are provided. Some specific applications for two-color and three-color displays include, for example, red-and-black displays for price signs to be used in the stores, orange-and-black displays for traffic signs and gas station signs, etc. Multi-color images can be formed by utilizing mixing of several colors to create a large color gamut. For example, a large color gamut can be provided by using red, green, and blue (RGB) primary colors in an RGB display. It is understood that other color combinations, different from RGB, can be used to provide color displays where color gamut may be adjusted as desired by selecting the colors to be mixed in the color display. Combination of four or more types of bichromal microspheres may be necessary, for example, red-and-white, blue-and-white, black-and-white, and yellow-and-white microspheres, are used in some embodiments. For applications where high brightness is desired, it is preferred that each set of microspheres contains a white segment. In some embodiments, a rather limited color gamut may be sufficient. For example, displays providing different shades of green and brown may be used for masking in outdoor, hunting and camping equipment, etc.

Some general operating principles that are applicable to color REDs provided herein will be now described. As it was mentioned, REDs use rotational movement of optically and electrically anisotropic elements to display images. The elements typically have a rotatable shape, such as a spherical, cylindrical, or football-like shape, of which spherical elements are most commonly used. The elements are electrically anisotropic having a non-uniform charge distribution and can be caused to move in electromagnetic field. This movement can be coupled with a change in the observed optical properties of the element, so that the viewer will observe different appearance of the element (e.g. black, white, red, green, blue, etc.) depending on the direction and the strength of the field. For example spherical elements having two optically dissimilar hemispheres (e.g., hemispheres of different colors) can be made to rotate in response to an electromagnetic stimulus and to display a hemisphere of particular color.

While element movement can be both translational and rotational, it is sometimes advantageous to constrain the movement to rotational movement only (or to rotational movement coupled with minimal translational movement). Displays limited to rotational movement generally require smaller driving voltages and result in faster response times. Therefore, in certain embodiments, rotating element displays of this invention employ only rotational movement of electrically anisotropic elements. It should be noted, however, that in some embodiments of the present invention, especially in some embodiments of Optically-Dimensionally Matched RED, there may exist a translational component to the movement of the elements, in conjunction with the rotational component.

Rotating elements of this invention are typically housed in a container matrix, which provides an array of cells for containing rotating elements in an ordered array. In some embodiments, especially in Optically-Dimensionally Matched RED, the rotating elements are distributed with no more than one element occupying a cell of a matrix. For example, the matrix may comprise an array of generally cylindrical cells to house the rotating elements. It should be understood, however, that in certain embodiments non-spherical rotatable display elements, such as cylinders, may be used, and a matrix with rectangularly-shaped cells may be appropriate. For example, cells may be structured as cavities, pockets, walls or channels, or alternatively consist of individual posts that separate particles. In most embodiments it is preferred to have no more than one element occupying the cell to minimize particle-to-particle interactions. In other embodiments where controlling particle-to-particle interaction is not critical to the performance of the device, more than one particle per cell can be used.

In many embodiments it is preferred to provide a matrix where the matrix cells form a close pack, such that interstitial area between the rotating elements is minimized in order to obtain a display having improved brightness and saturation of colors. For example, square, hexagonal, and rhomboidal close packs of cells may be provided. Suitable matrix designs, matrix materials and methods of matrix manufacturing are described in detail in the US Application Publication No. 2008/0100907 filed on Oct. 9, 2007, published on May 1, 2008, titled Electro-Optic Display, naming Lipovetskaya et al. as inventors, which is herein incorporated by reference in its entirety and for all purposes. For example, suitable matrices may be manufactured by hot embossing from heat-resistant polymers, such as polymethylmethacrylate, polyethylene terephthalate, polycarbonate, and the like.

In some embodiments, it is preferable to provide a matrix having high reflectance. For example, a matrix having white or light viewable surfaces can be used in some embodiments for providing brighter displays. Light or white matrix is particularly advantageous in the Matrix-Assisted RED with Color Filters, because the use of color filters reduces the display brightness and an optical "assistance" of white or light matrix is desirable. In the Multi-Color RED and Optically-Dimensionally Matched RED, the matrix can have a variety of optical properties, although highly reflective (e.g., white) matrix is preferred in some embodiments. Highly reflective matrix is described in US Application Publication No. 2008/0100907 which was previously incorporated by reference. White matrix can be formed for example by coating the matrix with a white pigment, or incorporating the white pigment into the Matrix structure during manufacturing. Suitable white pigments include, for example, titanium oxide and zinc oxide. While white and opaque matrix is preferred in many implementations, in the Background-Assisted RED implementation, the matrix should be transparent, such that background color is viewable through the matrix.

FIG. 1 illustrates a schematic cross-sectional view of a portion of an RED structure. FIG. 1 illustrates general structure of an RED having a container matrix, and does not show the details associated with specific types of color REDs that will be separately described in the following sections. Referring to FIG. 1, the viewable direction is indicated by an arrow 101. Electrically anisotropic bichromal spheres 103 are rotatably disposed within cells 105 defined by matrix walls 107, a front electrode layer 109, and a matrix base (support) 111. A backplane 113 is attached to the matrix base 111. The spheres are immersed in fluid 115, so that they can freely rotate when an electromagnetic field is applied. A plurality of electrodes 117 (no details depicted) are distributed in two dimensions on the backplane 113, so that each electrode can independently control a discrete region of the display, e.g., a single cell and sphere. Alternatively, one electrode can control multiple spheres. In one example, each sphere and associated backplane electrode together corresponds to one pixel on the display. In other embodiments, a plurality of spheres are controlled by one electrode, and correspond to one pixel. Each electrode 117 is typically a part of a controlling circuit which may include one or more switching elements, such as thin film transistors (TFTs) or thin film diodes (TFDs).

The front electrode layer 109 typically contains one or more electrodes and is usually composed of a conductive transparent material, such as indium/tin oxide (ITO) coated on polyethyleneterephthalate (PET). Other conductive transparent materials suitable for front electrode layer include conductive polymers (e.g. PEDOT (poly(3,4-ethylenedioxythiophene)), or PSS: PEDOT (poly(3,4-ethylenedioxythiophene) doped with poly(styrenesulfonate)), carbon nanotubes, doped oxide materials, such as aluminum/zinc oxide, and the like. These materials can be used either alone or as coatings on transparent substrates, such as PET. The front electrode layer should, preferably, have very high light transmissivity. For example, transmissivity of greater than about 82%, preferably greater than about 85% is preferred. ITO-PET films with these transmissivity properties are commercially available from a number of suppliers, such as CPFilms Inc. of Fieldale, Va. and Sheldahl Inc. of Northfield, Minn. Typically, the front electrode layer is a single sheet of electrode material covering all or a significant fraction of the pixels (and rotating elements) in the display. This is in distinction from the backplane electrodes, where each electrode is associated with a single pixel. In some implementations, the potential differential between the front and back electrodes creates the necessary electric field for rotation of the spheres. In some embodiments, however, the front electrode layer may include a plurality of electrodes, wherein each electrode may address rows or columns of pixels or rows or columns of individual rotating elements of the display. Note that the assembly 119 is usually referred to as the "front plane" of the device and includes the front electrode layer 109, the matrix, the spheres, and the fluid.

In one example, the bichromal spheres 103 have positively charged colored hemispherical coating, while the remaining hemisphere is white and uncharged (or negatively charged). When an appropriate potential difference is applied between the electrodes on the back and front planes, the sphere in a pixel element will rotate so as to align its charges with the applied electric field, thereby presenting a black or white hemisphere to the viewer. The rotation between states, in some embodiments, is by about 180±15°, so that a colored (e.g., black, red, green, blue, etc.) or a white hemisphere is fully visible. It is understood, that a variety of combinations of optical properties in a sphere may be utilized to create the desired visual effect.

In some embodiments, an image that displays lighter and darker colors can be produced, for example, if selected spheres are not completely rotated. In one example, the viewer will see parts of both colored and white surfaces of individual spheres, so that an impression of lighter shade will be created. Incomplete rotation of black-and-white spheres in the absence of color filters or background color involvement will result in gray images, partial rotation of red-and-white spheres will appear pink to the naked eye. Incomplete rotation of the spheres can be used, in some embodiments of all four color RED types described herein. Such incomplete rotation of the spheres can be achieved by applying smaller voltages than those needed for 180° rotation or by applying voltage in pulses of short duration, e.g., by pulse width modulation (PWM) methods. In some embodiments, 90 degree and 270 degree rotations are achieved by applying magnetic field (time-variable electric impulse) to anisotropic spheres having hemispheres of different conductivity. A combination of electric and magnetic fields can also be used to achieve this effect. Other methods of achieving partial rotation of the spheres can be used as disclosed in U.S. Application Publication No. 61/107,605 title Rotating Element Transmissive Displays incorporated here fully by reference. These methods are applicable not only for creating lighter or darker color images when bichromal spheres are used, but they can be also employed to rotate a multi-colored sphere to a specific degree that is different from 180°. For example, spheres having quadrants or thirds of different color can be rotated by 90 or 120° by using pulse width modulation methods.

Figure 2:
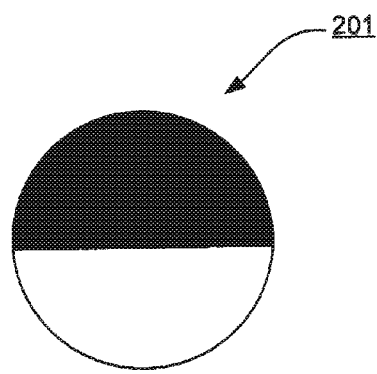
FIG. 2 shows a side view of a bichromal sphere suitable for a rotating element display.

An illustrative example of a rotating element suitable for an RED display is shown in FIG. 2. The illustrated element 201 is a sphere which contains two hemispheres with optically and electrically dissimilar properties. A combination of optical properties in a rotating element will depend on the particular RED type, and on the desired performance characteristics of the display. For example, Background-Assisted REDs and Matrix-Assisted REDs with Color Filters may employ black-and-white spheres, because the color contribution in these displays will typically be derived from color background or color filters. However, these displays need not necessarily employ only black-and-white spheres, and may, in some embodiments, use spheres with other combinations of optical properties (e.g., with a variety of combinations of colors) to achieve the desired color mixing and visual effects. In the Multi-color RED and Optically-Dimensionally Matched RED typically at least two types of spheres with different combinations of optical properties are used. For example, red-and-white and black-and-white spheres may be used for a color display having red, white, and black colors, e.g., for price signs in the stores. Orange-and-white and black-and-white spheres may be used in an orange-and-black display that can be employed in traffic signs. Red-and-white, green-and-white, and blue-and-white spheres may be used for a multi-color display.

In general, elements suitable for use in the rotating element display may have a variety of shapes and structures. Rotatable elements suitable for use with this invention may be shaped as spheres, cylinders, ellipses, ovals, football-shaped elements, and the like. Structural aspects of these elements will be illustrated with the reference to spheres, but it should be understood that the same structural considerations can be applied to other shapes.

The spheres suitable for the REDs, may have a hollow or solid core, and may be hemispherically coated, or may include two dissimilar fused hemispheres. In some embodiments, hemispherically coated spheres are preferred. The spheres may be coated with one or more coatings, so that the coating or coatings provide optical and electrical anisotropy to the sphere. A variety of coating methods known to those of skill in the art can be used. In some embodiments hemispherically coated elements can be manufactured by the transfer coating methods described in application Ser. No. 60/876, 767, titled "Hemispherical Coating Method for Micro-elements", naming Lipovetskaya et al. as inventors filed Dec. 22, 2006, which is herein incorporated by reference in its entirety and for all purposes.

In one example, the core sphere can be hemispherically coated (or approximately hemispherically coated) with two coatings having different optical and electrical properties. For instance, a white coating providing negative charge and a black (or color) coating providing positive charge can be employed. The core sphere itself may be neutral or charged. In this example (employing two different coatings on a core sphere), optical properties of the core sphere are typically not important, since its surface is not presented to the viewer.

In those cases, when the core sphere itself has suitable optical properties (e.g., color or highly diffuse or specular reflectance), it can be hemispherically coated with a coating differing from the core sphere both optically and electrically. For example, a white essentially neutral sphere can be hemispherically coated by black, red, green, or blue coating containing additives carrying negative charge. Alternatively, a bright red core can be hemispherically coated white, resulting in red-and-white rotating particle.

In an alternative embodiment, no core sphere is employed, and instead two hemispheres with different properties can be fused together or otherwise combined to form an optically and electrically anisotropic sphere. For instance, solid or hollow optically dissimilar hemispheres carrying opposite charges can be fused.

In some embodiments, for example, in Multi-Color REDs and in Optically-Dimensionally Matched REDs, microspheres with several types of cores may be used to create sets of microspheres that have a unique response to electric field. For example, cores made out of various polymers, glass or ceramic have different density and internal charge characteristics. Carefully selecting core materials and matching with a suitable hemispherical coating formulation enables creation of bi-chromal microspheres that differ optically and respond differently to electromagnetic field.

The components of the bichromal sphere (i.e. the core and the coating, or fused hemispheres) can be selected to achieve a unique desired electromagnetic response such that each type of microspheres might have a faster or slower response to specific voltage, frequency, or waveform. For example, RED device might incorporate two sets of bichromal microspheres that rotate at a different speed in response to a certain voltage waveform. When the voltage is applied, the image would first change to the first color and gradually change to the second color, thus creating a color-changing effect with one driving scheme.

Aside from possessing different colors, the spheres can possess other types of optical anisotropy. For example, hemispheres with different levels of diffuse and specular reflectance can be used. In other examples, the rotating elements may have retroreflective or light-emitting portions. Further, rotating elements having luminescent (e.g. fluorescent or phosphorescent) portions may also be used. These, for example, may be prepared by applying hemispherical coating doped with luminescent material to the core sphere, or alternatively the core material itself may have retroreflective or fluorescent properties.

In some embodiments, the spheres should be relatively small in order to provide good display resolution. Appropriate sizes include spheres with diameter ranges of about 25-250 µm, such as 35-100 µm. Obviously there may be some variance in the sizes of the spheres in a given display. This can be controlled by appropriate sizing techniques such as sieving. Further, in the Optically-Dimensionally Matched RED at least two types of spheres with different sizes and different combinations of optical properties are used. As an illustration, a population of spheres having 45-49 µm diameter and a population of spheres having 65-69 µm diameter may be used in an Optically-Dimensionally Matched RED.

It should be realized, that much larger elements may be used in certain embodiments. For example, for billboard signs that are typically viewable from the distance of several hundred feet, rotating elements having a diameter of 1-2 inches may be appropriate. In general, elements of any size, that would produce a good display resolution for a particular application of the display, will be suitable.

The materials used for the core sphere and for the coatings should preferably have a melting point or glass transition point of higher than 100° C., in order to withstand high-temperature operations during the manufacturing process and exposure to high temperature during end use. The core and the coating materials should also be compatible with the fluid in which the spheres will be suspended for rotation, e.g., they should not dissolve or swell in this fluid even at elevated temperatures. Further, it may be desirable to employ elements having a density that is similar to that of the dielectric fluid. In certain embodiments, the spheres, or at least the core sphere is made from a material such as glass, ceramic, or polymer. The spheres, although they can be made from intrinsically brittle materials, should have good crushability characteristics. For example, they may be able to withstand compressing liquid pressure in the range of 350-3000 psi, as used in the standard industry crushability test.

Rotation of the spheres by 180 degrees (or by a greater or lesser amount as necessary to effect a display transition) should occur within a defined window of electric field. The transition should occur easily at fields generated by actuation of backplane control circuits. Typically, a field of about 0.2 V per micrometer is generated (e.g., a potential differential of about 15-20 volts is generated over 75-100 micrometers (a typical back and front electrode separation distance of this invention) but should not occur at significantly lower voltages such as those encountered to charge lines in the backplane. Thus, in some examples, display transitions may be designed to occur at fields attained at 15-20 volts over 75 micrometers.

The core spheres suitable for manufacturing REDs can be obtained from various commercial suppliers. Highly spherical polyethyelene microspheres in many colors, densities and particle sizes can be obtained from Cospheric LLC, Santa Barbara, Calif. If glass and ceramic microspheres are needed, it may be necessary to sieve commercially obtained spheres in order to ensure a tight size distribution suitable for electrophoretic displays. For example, hollow and solid glass spheres can be obtained from 3M Corporation, Maplewood, Minn. (Scotchlite glass bubbles, K-series (e.g., K1, K15, K25, K32, or K46)). In addition, hollow glass spheres can be obtained from Potters Industries, Berwyn, Pa. Ceramic spheres can be obtained from Saint-Gobain Coating Solutions, Northampton, Mass., and plastic spheres can be obtained from Asia Pacific Microspheres SDN BHD, Selangor Darul Ehsan, Malaysia & Grinding Media Depot, Wyncote, Pa.

The spheres should typically be electrically anisotropic, in order to be sensitive to the electromagnetic field. Electric anisotropy does not necessarily imply that the two hemispheres are oppositely charged. It is sufficient, that there is some nonuniformity in the charge distribution of the sphere and that this nonuniformity correlates with optical anisotropy. A variety of different charge distributions are possible. For example, hemispheres may have opposite charges of equal or different magnitude. It is also possible to have different charge densities but the same charge polarities present at the two hemispheres. In general, spheres having any nonuniformity in charge distribution about their surface, e.g. a dipole moment, can be used.

In one embodiment, significant quantity of charge is provided to the sphere via the coatings, particularly by the hemispherical coating, while the core sphere is neutral or possesses a small amount of charge. The hemispherical coating should preferably provide a permanent electric charge. The necessary charge may be provided, for example, by the pigment or the binder of the coating or by special charge enhancing additives. Examples of these additives include quaternary ammonium compounds, organic sulfates and sulfonates and other compounds known to those of skill in the art, such as those listed in U.S. Pat. No. 6,379,856, which is incorporated herein by reference in its entirety. The necessary charge may also be provided by special processing techniques of coating preparation and application. These techniques impart charge by, e.g., applying friction to the coating material as it is dispensed.

In one embodiment, the coating is relatively thin in comparison to the dimensions of the sphere (e.g., about 1-2 µm thickness). The coating should provide optical and surface properties as presented above (e.g., reflectivity, opacity, color, and roughness). In certain embodiments, the coating is made from binder and a pigment. In some embodiments, a solvent may be added for manufacturing. In some embodiments, a special charge-imparting agent may be added.

The spheres are electrically anisotropic when immersed into the fluid for rotation. While it is advantageous that they possess a permanent electrical anisotropy, in some embodiments this anisotropy may be induced or enhanced when they are immersed into the fluid, either by the fluid itself or by other means.

The fluid should have appropriate characteristics that will allow sufficient rotation (e.g., complete 180 degree) of the sphere in the preferred driving potential range. Dielectric fluids, essentially non-conductive transparent fluids, such as silicon oils, mineral oils and isoparafins are suitable. The fluid should preferably have a conductivity of less than 1000 femtomho/cm (femtosiemens/cm), preferably between about 20 and 200 femtomho/cm. In certain embodiments, the fluid will have a low dielectric constant (e.g., less than about 2.5 (preferably less than about 2)) and a viscosity of between about 0.5 and 5 centistoke. These characteristics are selected so that a threshold voltage, response time, and operating voltage window of the device are optimized. Examples of suitable dielectric fluids include silicone fluids, such DC200 available from Dow Corning of Midland, Mich., isoparafins, such as ISO-PAR, available from Exxon Mobile of Irving, Tex., and fluorinated fluids manufactured by 3M.

Throughout this document, hemispherical optical and electrical properties are discussed. This does not imply that the optical or electrical properties are limited to exactly hemispherical dimensions. In certain embodiments, the elements may be designed to have one optical material occupy less than a full hemisphere of the element's surface and another optical material occupy more than a full hemisphere.

Further, even if the desired result is hemispherical, it should be noted that suitable displays may be produced, in certain embodiments, using populations of rotating elements that have significant variance in the geometric extent of the optical or electrical properties. For example, it may be suitable to use a population of rotating elements having optical coatings that vary on average by 10% or even 30% from a perfectly hemispherical covering. Other applications may not tolerate such wide variance.

Multi-Color REDs

Multi Color REDs utilize combination of several distinct sets of bi-color rotating elements that differ in optical characteristics and in electromagnetic response. For example, RED of this type might combine red-and-white, green-and-white, and blue-and-white spheres, each set of microspheres with a unique response to electromagnetic field. Utilizing sets of microspheres that vary in electromagnetic response in addition to their optical characteristics enables multiple colors to be addressed with a single electrode. For example, one electrode can be used to address red, green and blue subpixels with unique waveform, frequency or pulse width modulation, compared to three electrodes needed in a display with bi-color rotating elements that do not differ in electromagnetic properties.

As a result, the described Multi-Color RED is capable of creating color images using fewer electrodes and electronic circuits, enabling a simpler, cost-effective display with multi-color functionally.

Multi-color REDs make use of a matrix structure where matrix cells form a close pack, such that the microspheres are arranged with maximum packing density and the space between rotating elements is the minimum necessary to allow clearance for free rotation of elements in dielectric fluid. For example, square, hexagonal, and rhomboidal close packs, as well as combinations of patterns for improved packing density and manufacturability may be utilized. Suitable matrix designs, matrix materials and methods of matrix and device manufacturing are described in detail in the US Application Publication No. 2008/0100907 filed on Oct. 9, 2007, published on May 1, 2008, titled Electro-Optic Display, naming Lipovetskaya et al. as inventors, which is herein incorporated by reference in its entirety and for all purposes. In some embodiments, it is preferable to provide a matrix having high reflectance. For example, a matrix having white or light viewable surfaces can be used in some embodiments for providing brighter displays.

Multi-Color REDs may utilize two, three and more distinct types of rotating elements, which can all be the same size or alternatively can have different sizes and utilize specially designed container matrix as described in Optically-Dimentionally Matched Color REDs embodiment.

Methods of addressing active particles with different electromagnetic responses, such as threshold addressing for example, are disclosed in U.S. Pat. No. 6,693,620 B1 issued to Herb et al., which is herein incorporated by reference in its entirety. The methods and apparatus disclosed in this patent are in relation to encapsulated devices but can be similarly applied to rotating elements devices.

Figure 10:
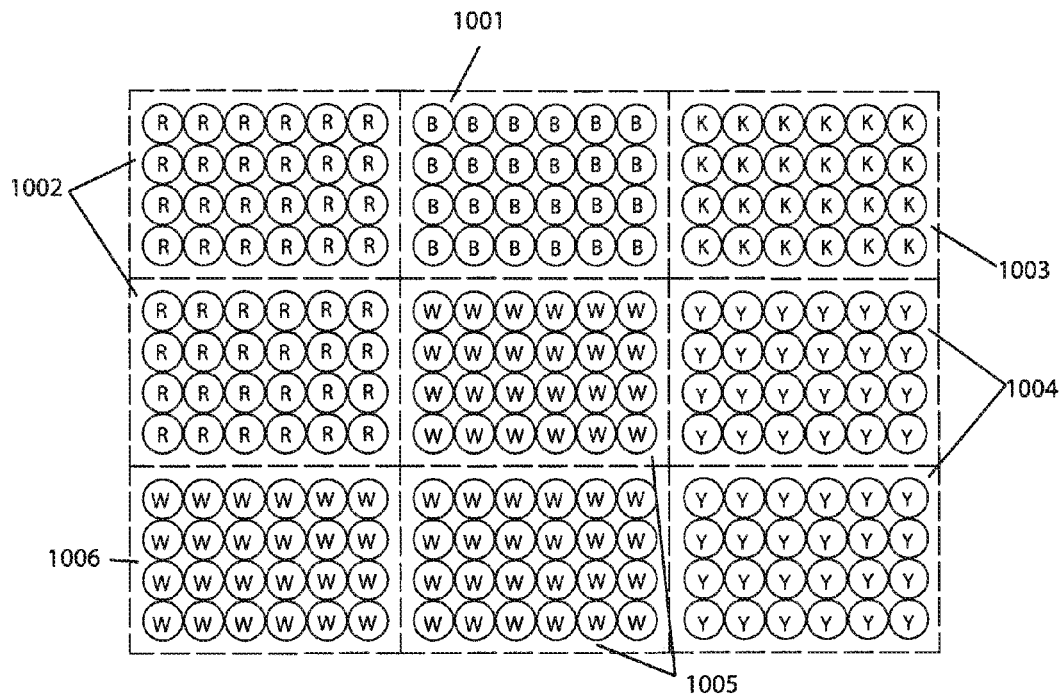
FIG. 10A shows a top view of a section of a display containing nine regions where each region contains only one type of rotating elements.
FIG. 10B shows a top view of a section of a display containing nine regions where each region contains a mixture of three types of rotating elements.
Figure 10:
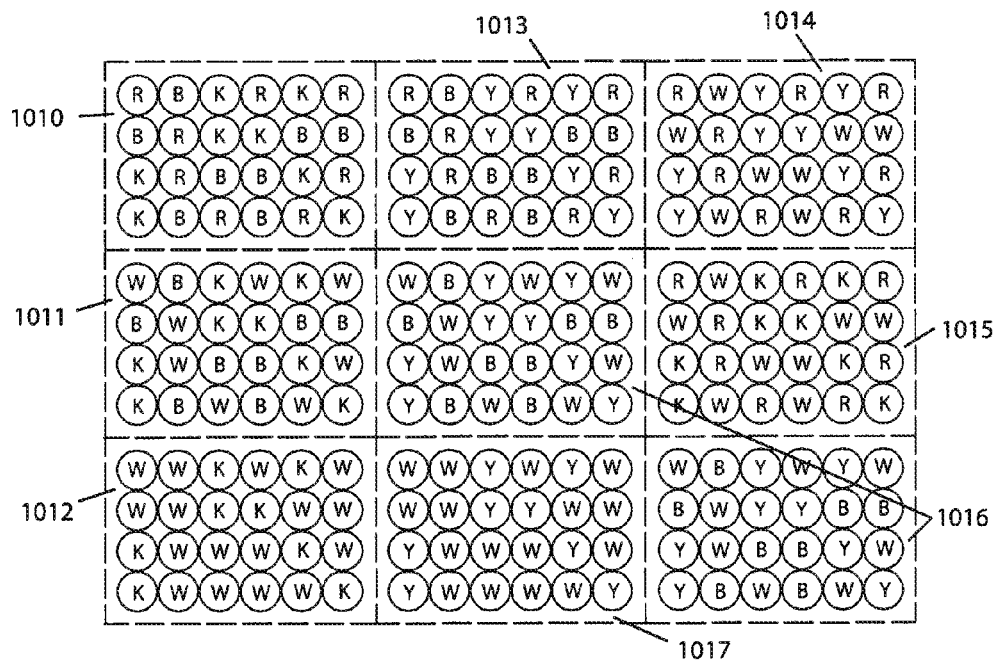

Examples of Multi-Color Display structures are illustrated in FIGS. 10A-10B and in FIGS. 11A-11H.

The backplane of Multi-color RED device contains a plurality of electrodes disposed in two dimensions, where each electrode is configured to control a specific region of the display. The image on the display is created by driving the electrodes for each region with specific electromagnetic signal that will rotate the micropsheres in that region to the desired orientation. In response to electromagnetic signal, microspheres will rotate to make one hemisphere visible to the observer through the transparent front electrode, while the other hemisphere will be hidden from view, collectively displaying a color in that region.

FIG. 10A shows a section of the display containing 9 regions controlled by individual electrodes as seen through the transparent front electrode with each microsphere oriented to show one hemisphere to the viewer and hide another hemisphere. In one embodiment, illustrated in FIG. 10A, individual electrodes are configured to control specific regions of the display where each region contains only one type of rotating elements. "R", "B", "K", "W", and "Y" correspond to red, blue, black, white and yellow hemisphere as seen by the viewer. For example, regions 1001 and 1005 contain only blue-and-white elements. Region 1001 contains blue-and-white micropsheres oriented to display their blue hemispheres to the observer and region 1005 contains same blue-and-white microspheres oriented to display their white hemispheres to the observer. Regions 1003 and 1004 contain yellow-and-black elements, with region 1004 showing microspheres oriented to display yellow and 1003 with same microspheres oriented to display black hemispheres to the viewer. Similarly, regions 1002 and 1006 contain red-and-white spheres. Regions 1002 show microspheres oriented to display red hemisphere and region 1006 shows same microspheres oriented to display white hemisphere.

In the preferred embodiment, shown in FIG. 10B, each electrode is used to control a region of the display containing several types of elements that vary in their optical characteristics as well as in electromagnetic response. FIG. 10B shows 9 regions, each of them incorporating an equal mixture of red-white, blue-white and yellow-and-black microspheres. In this embodiment different electromagnetic signals are provided for rotating distinct elements. For example, in one embodiment, one set of bichromal spheres will require smaller threshold voltage for rotation, while another set will require medium threshold voltage, and still another set of elements will require large threshold voltage, thereby allowing for selective addressing of distinct elements using one electrode. In other embodiments, dissimilar elements may be configured to respond differently to different waveform signals, magnetic signals, etc.

FIG. 10B region 1010 shows microspheres in the first orientation with red, blue and black hemispheres visible to the observer, collectively creating a region that appears dark purple. Region 1014, for example, shows microspheres in the second orientation with red, white and yellow hemispheres visible to the observer, creating a region that appears orange. Similarly, brown appearance is achieved in region 1013 by rotating spheres to the third orientation to show red, blue and yellow. Region 1011 appears blue by rotating microspheres to fourth orientation, showing white, blue and black hemispheres to the viewer. Region 1012 appears grey with micropsheres rotated to fifth orientation where all microspheres are showing their white or black hemispheres. Region 1015 appears red, by rotating microspheres to their sixth orientation, with red, white and black hemispheres facing the viewable area. Regions 1016 appear green, by rotating microspheres the seventh orientation, with white, blue, and yellow hemispheres visible. Finally, region 1017 appears yellow, by rotating microspheres to the eighth orientation with yellow and white hemispheres visible to the observer through the transparent electrode.

A region controlled by one electrode can contain as few as a single element of each type or alternatively can encompass a whole display (i.e. the whole display is driven by one electrode). Typically the number of rotating elements in a region would be defined by desired specifications of the final device, such as the size of the display, resolution and viewing distance.

Rotating elements with any color combinations can be used to achieve desired color gamuts or color effects. Two, three, four and more sets of rotating elements can be used. In addition, rotating elements can similarly contain transparent, metallic, luminescent, fluorescent, phosphorescent sections among others to create specific color effects in the display.

Manufacturing of Multi-Color RED Device

Building of a Multi-color RED device typically starts with selecting bichromal microspheres which can be combined and oriented to produce desired color effects in a display. FIGS. 11A-11H illustrate an example of how two sets of microspheres can be combined to create a four color device. In this example, red-and-white and black-and-white spheres are combined to create a device capable of displaying four colors (white, grey, light red and dark red). Two sets of microspheres also vary in electromagnetic threshold response, red-and-white spheres having a higher electromagnetic threshhold response and black-and-white spheres having a lower electromagnetic threshold response. Such bichromal microspheres can be obtained, for example, by applying red and black hemispherical coating to opaque white cores in different densities.

In this example, a mixture of 50% red-and-white and 50% black-and-white microspheres in either dry state or a slurry is created by known mixing techniques and disposed in a condensed square pack containment structure 1101. Close pack arrangements of the spheres are preferred in many embodiments to maximize the active area of the display resulting in brighter colors. A number of suitable containment matrix designs configured for holding one element per cell, are described in the US Application Publication No. 2008/0100907 which was previously incorporated by reference.

The microspheres can be loaded into the matrix containment structure, for example, by creating a slurry of microspheres in a dielectric fluid, loading the slurry of microspheres onto the absorbent member (e.g. a sponge or a brush) and applying the slurry to the top of the matrix until each cavity is occupied by a microsphere. The excess of microspheres is removed with another clean and dry absorbent member. The mixture of microspheres is continuously stirred during the application process to ensure uniform distribution of two sets of microspheres in the containment structure.

A front electrode layer (e.g., ITO-coated PET) 1102, 1112, 1122, 1132 is attached to the top of the matrix populated with spheres, for example, using heat-activated adhesive. This procedure and other details of RED assembly that can be applied for fabrication of color REDs described herein, are described in the US Patent Application Publication 2008/0100907, which was previously incorporated by reference.

After the front electrode had been attached to the matrix, the structure is filled with a dielectric fluid by creating a vacuum within the structure and drawing the dielectric fluid in to the structure through open channels of the matrix. A dielectric fluid is provided within the cells of a matrix, to enable the elements to rotate from a first orientation to a second orientation within their respective cells when an electromagnetic field is applied to the cells. The matrix is then edge-sealed and attached to the backplane of the display, by, for example, using pressure-activated adhesive. The backplane contains electrodes that are used to drive regions of the display.

Even though this example shows combining equal proportions of the microspheres of each set, using unequal proportions of bichromal microspheres might be advantageous for some applications. Adjusting the ratio of bichromal microspheres can be use to modify the color gamut or increase saturation of certain colors.

Figure 11:
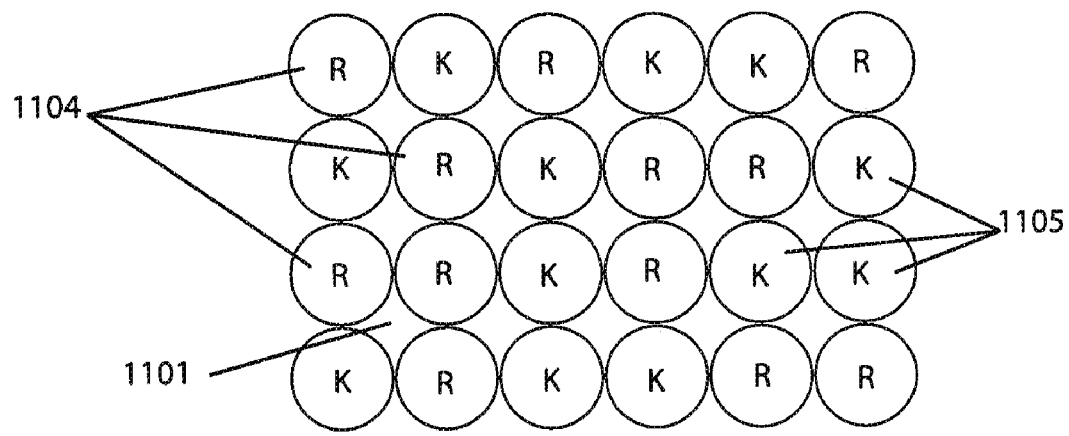
FIG. 11A shows a top view of a single region that appears dark red to the observer.
FIG. 11B shows a cross section view of the region shown in FIG. 11A.
FIG. 11C shows a top view of a single region that appears light red to the observer.
FIG. 11D shows a cross section view of the region shown in FIG. 11C.
FIG. 11E shows a top view of a single region that appears white to the observer.
FIG. 11F shows a cross section view of the region shown in FIG. 11E.
FIG. 11G shows a top view of a single region that appears grey to the observer.
FIG. 11H shows a cross section view of the region shown in FIG. 11G.
Figure 11:
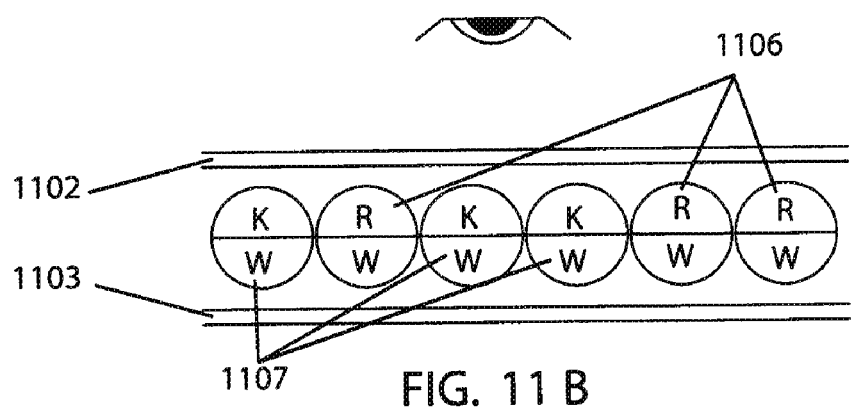
Figure 11:
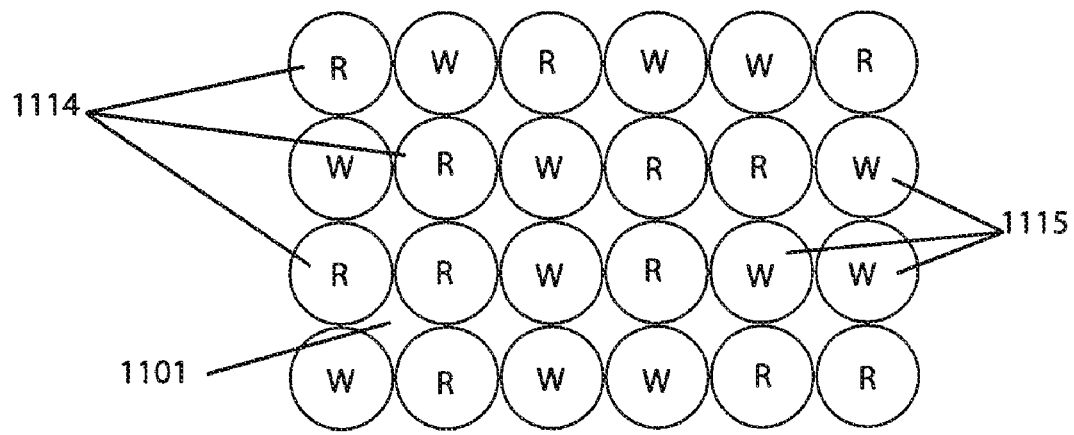
Figure 11:
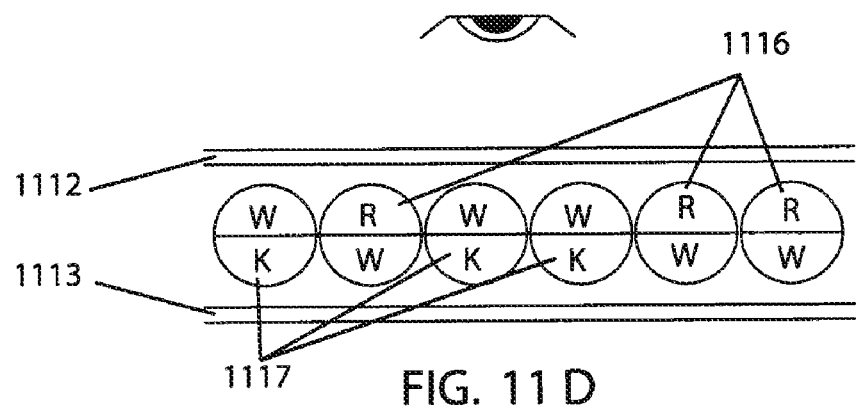
Figure 11:
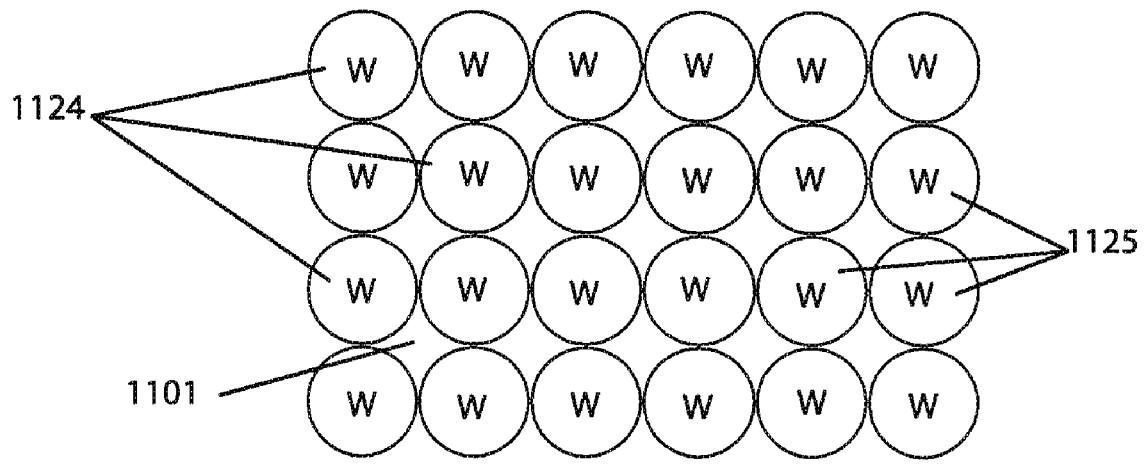
Figure 11:
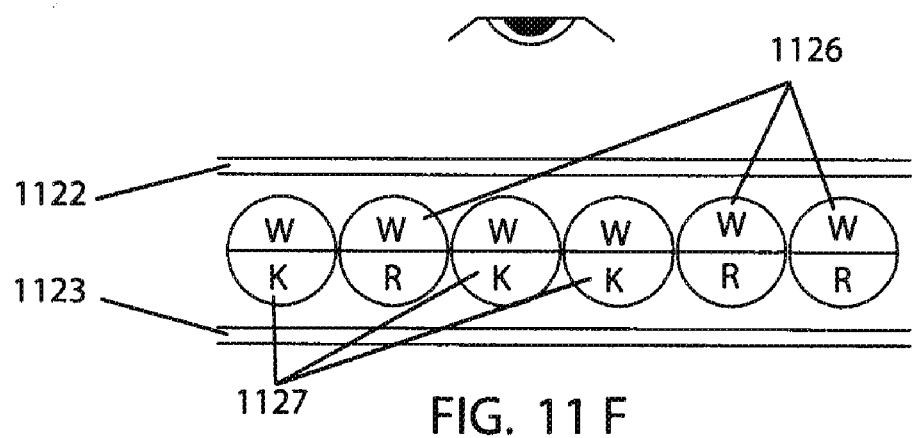
Figure 11:
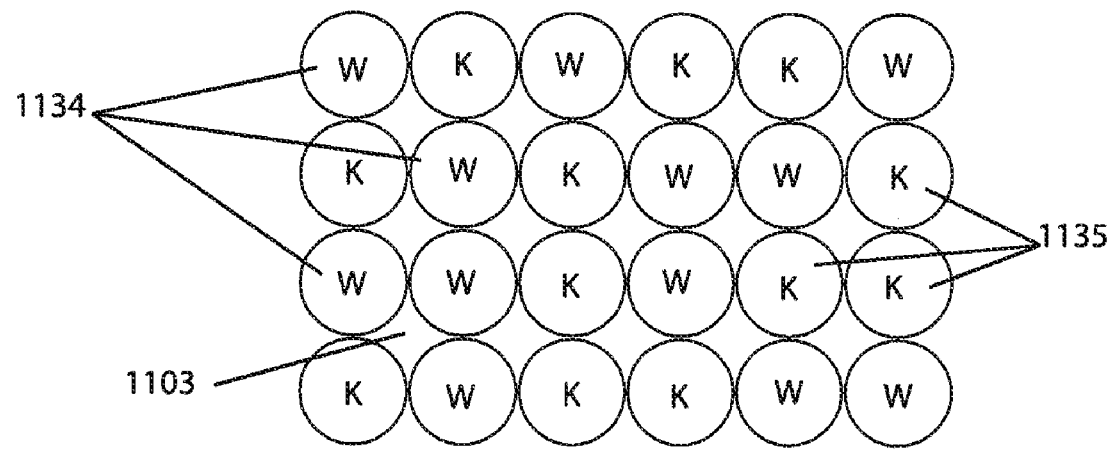
Figure 11:
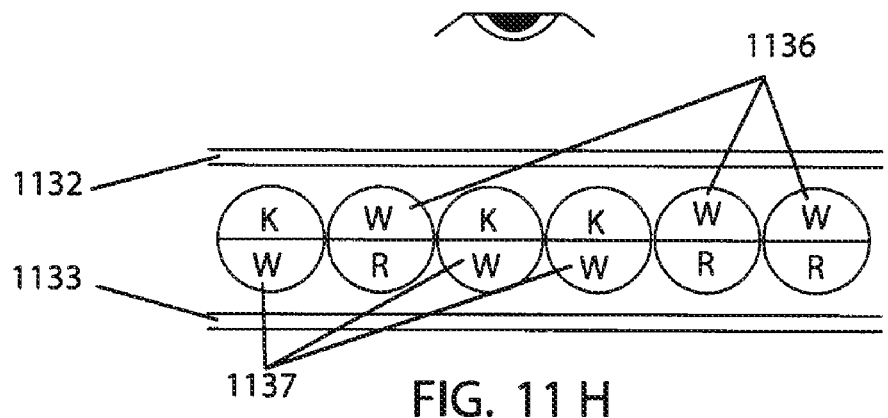

Operation of Multi-Color RED Device:

A display containing a mixture of black-and-white and red-and-white microspheres as described above will consist of regions driven by electrodes, where each electrode is used to control a region of the display containing two types of elements. One region of such display incorporating red-and-white and black-and-white spheres is shown FIGS. 11A to 11H. FIGS. 11A and B show this region in dark red state, FIGS. 11C and D show light red state, FIGS. 11E and F show white state, and FIGS. 11G and H show grey state. In this example, both red-and-white and black-and-white micropsheres are optically and electrically anisotropic, with white hemispheres having a higher positive charge compared to colored hemispheres. This creates a dipole on the sphere and enables rotation of the element in response to electromagnetic signal. In this particular example black-and-white micropsheres rotate at a lower applied threshold voltage, and red-and-white mciropsheres rotate at a higher applied threshold voltage. The front transparent electrode is typically grounded. The voltage is applied to the backplane electrode.

FIG. 11A shows a top view of a single region visible to the observer through the transparent front electrode. In this figure red-and-white microspheres 1104 are oriented to show red hemispheres to the viewer and black-and-white microspheres 1105 are oriented to show black hemisphere. As a result, the region appears dark red. FIG. 11B shows a cross-section of the region to illustrate further how such orientation of microspheres is achieved. As illustrated in FIG. 11B, when a high negative voltage is applied to the backplane electrode 1103 and transparent electrode 1102 is grounded, the elements of both types 1106 and 1107 rotate in response to applied electric field and align according to their dipole with colored hemispheres facing the viewable area as seen through transparent electrode 1102. As a result, the white hemispheres are hidden from view, and the red and black hemispheres collectively appear as a dark red region to the viewer.

FIG. 11C shows a top view of the same region visible to the observer through the transparent front electrode. In this figure red-and-white microspheres 1114 are oriented to show red hemispheres to the viewer, while black-and-white microspheres 1115 are oriented to show white hemispheres. As a result, the region appears light red. FIG. 11D shows a cross-section of the region after a low positive voltage is applied to the backplane electrode 1113 and transparent electrode 1112 is grounded. Starting with the region in dark red orientation as shown in FIGS. 11A and 11B, applying low positive voltage to the region will maintain red-and-white microspheres 1116 with red hemispheres facing the viewable area, since red-and-white microspheres require higher applied voltage to initiate rotation. Black-and-white elements 1117 will rotate in response to applied electric field and align according to their dipole with white hemispheres facing the viewable area as seen through transparent electrode 1112 and black hemisphere hidden from view. As a result, red and white hemispheres are visible through the transparent electrode 1112 and collectively appear as a light red region to the viewer.

FIG. 11E shows a top view of the same region visible to the observer through the transparent front electrode. In this figure both red-and-white spheres 1124 and black-and-white spheres 1125 are rotated to show white hemisphere to the viewer, creating a region that appears white. FIG. 11F shows cross-section of the region when a high positive voltage is applied to the backplane electrode 1123 and transparent electrode 1122 is grounded. Since white hemisphere is more positive in both types of microspheres and high voltage is applied, both types of elements 1127 and 1126 will now rotate in response to applied electric field and align according to their dipole to present white hemispheres to the viewer, resulting in a visibly white region.

FIG. 11G shows a top view of the same region visible to the observer through the transparent front electrode. In this figure red-and-white spheres 1134 are oriented to show white hemisphere to the viewer, and black-and-white spheres 1135 are oriented to show black hemispheres, collectively creating a region that appears grey. FIG. 11H shows cross-section of the region after a low negative voltage is applied to the device in the white state shown in FIGS. 11E-F. When a low negative voltage is applied to the backplane electrode 1133 and transparent electrode 1132 is grounded, red-and-white microspheres 1136 will maintain their orientation with white hemispheres facing the viewable area, since the red-and-white micropsheres require higher applied voltage to initiate rotation. Black-and-white elements 1137 will rotate in response to applied electric field and align according to their dipole with black hemispheres facing the viewable area as seen through transparent electrode 1132 and white hemisphere hidden from view. As a result, black and white hemispheres are visible through the transparent electrode 1132 and collectively appear to the viewer as a grey region.

A plurality of such regions is combined to create a display of any size. Even though this example uses only two types of microspheres for simplicity of illustration, displays utilizing three, four and more combinations of sets of microspheres can be used to achieve a wider color gamut. In cases where more than two types of microspheres are used the method of selecting the microspheres and manufacturing the device will remain the same. However, the mechanism for driving the electrodes will become more complex to ensure that orientation of each type of spheres is properly controlled and could include for example, voltage frequency, various waveforms, and magnetic signals.

Optically-Dimensionally Matched Color REDS

Optically-Dimensionally Matched RED employs a specially designed container matrix that allows formation of discrete optically dissimilar regions within the display. The container matrix includes a plurality of cells, which include cells of different sizes, e.g. smaller cells of a first type and larger cells of a second type. The matrix houses a plurality of optically anisotropic elements which include a plurality of elements of a first type and a plurality of elements of a second type, where the elements of the first type are smaller than the elements of the second type, and where the smaller elements of the first type occupy only the cells of the first type, and the larger elements of the second type occupy only the cells of the second type. The elements of the first and second types possess different combinations of optical properties, e.g., an element of the second type may have a different color combination than the element of the first type. For example, smaller black-and-white spheres may be housed in a matrix region having smaller cells, while larger red-and-white spheres may be housed in an adjacent matrix region having larger cells. The dissimilar regions of the populated matrix in some embodiments alternate over the entire display area and are controlled by backplane electrodes, such that pre-determined spheres with the desired combination of optical properties are addressed and rotated as desired to create a color image. A fluid is provided within the cells of a matrix, such that the elements can rotate from a first orientation to a second orientation within their respective cells when an electromagnetic field is applied to the cells. In some embodiments the matrix will contain cells of more than two types to house rotating elements of more than two types, such that each type of the cell is matched with a specific type of a rotating element. For example, a multi-color display can be formed by using color mixing from alternating regions populated by red-and-white, green-and-white, and blue-and-white spheres.

Optically-Dimensionally Matched REDs are particularly well suited for providing displays where dissimilar regions alternate on small scale (e.g., with alternating regions being less than about 2 mm wide, less than about 1 mm wide, or less than about 0.5 mm wide) and allow for color mixing. In some embodiments, it is preferred that dissimilar alternating matrix regions of the display have substantially equal areas, providing for optimal color mixing.

In alternative embodiments displays with large macroscopic discernable regions are provided and color mixing between adjacent regions is not relied upon. For example, macroscopic regions can have areas of greater than 1 cm$^2$. For example, in one such embodiment one half of the display may include larger cells populated by black-and-white spheres, while the other half of the display may include smaller cells populated by smaller red-and-white spheres, creating a display having black-and-white portion and a red-and-white portion without significant color mixing.

Referring again to an embodiment which uses color mixing, it is understood that displays having alternating regions having a variety of different colors, may be used. An RGB display will be used as an illustration, but it is understood, that 2, 3, 4 or more alternating optical regions may be used to create a variety of color schemes. Each region, in one embodiment, has a width of between about 1-50 matrix rows or columns, preferably between about 2-20 rows or columns. In a specific example each region comprises between about 4-10 rows or columns of cells.

One embodiment in which alternating discrete regions of the display are populated by red-and-white, green-and-white and blue-and-white spheres matched to the sizes of the matrix cells, is illustrated with reference to FIGS. 3A-3J and FIG. 4. FIGS. 3A-3J show different views of a container matrix suitable for such a display, while FIG. 4 illustrates three types of optically dissimilar spheres chosen for this display. The red, green and blue colors provided by the spheres are mixed in this display providing a large color gamut associated with an RGB color system. The illustrated display is entirely reflective and may be viewed in ambient light without backlight illumination.

Figure 3A:
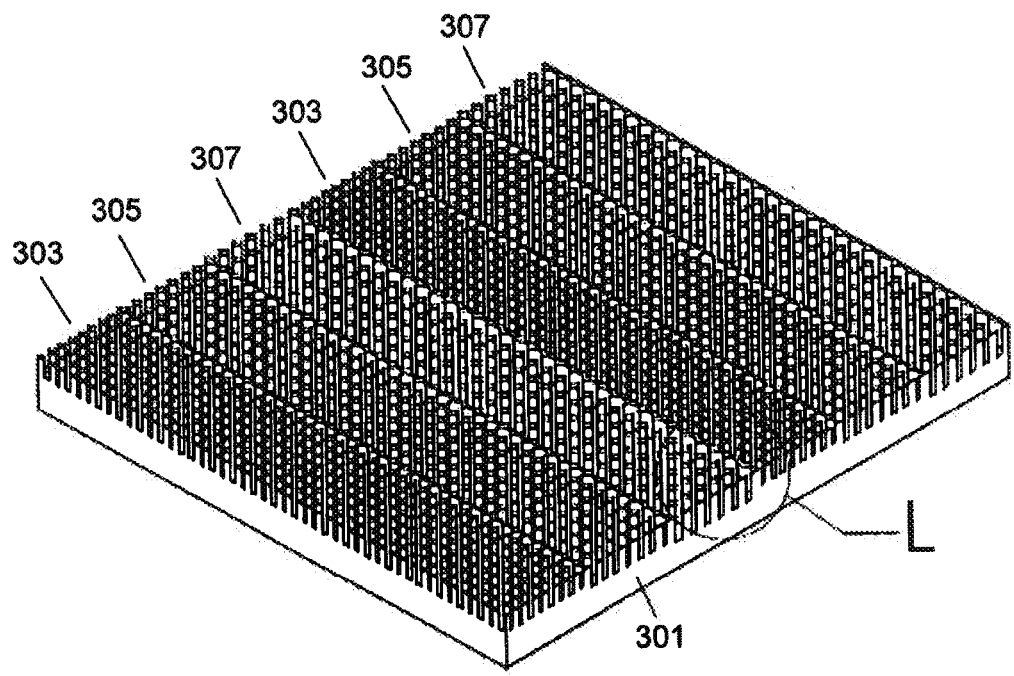
FIG. 3A shows an isometric view of a matrix structure having three alternating regions of different-size cells.
Figure 4:
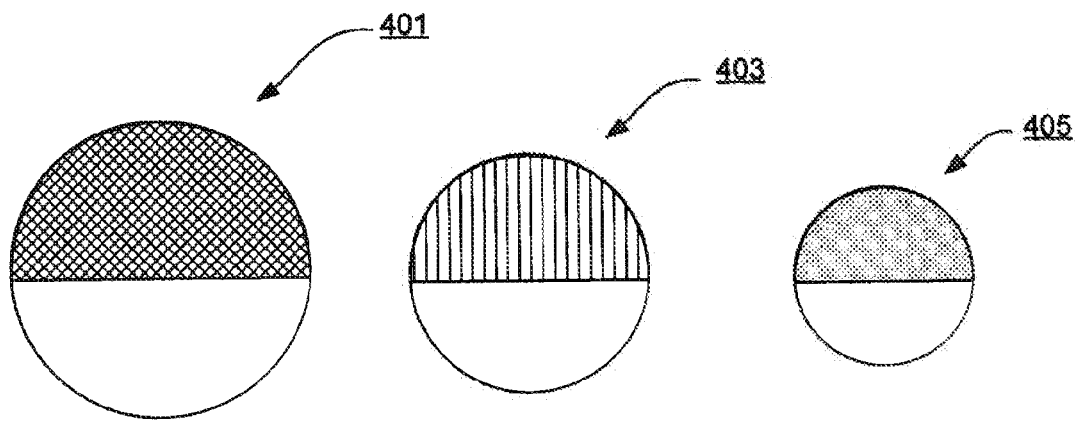
FIG. 4 shows three bichromal spheres suitable for use with the matrix shown in FIG. 3A.

Referring to FIG. 3A, an isometric view of a container matrix suitable for an RGB display is shown. The matrix contains a base (support) 301 and three types of cells arranged in three distinct alternating regions, 303, 305, and 307, where region 303 contains the smallest cells, region 305 contains medium cells, and region 307 contains the largest cells. Each region extends along one axis for the entire length of the display, and along another axis for a width of several rows. It is preferable in some embodiments, to manufacture the matrix such that the distinct regions have substantially the same area, e.g., areas that differ by less than 20%, preferably by less than 10%, or even by less than 5%. To accommodate this feature, the regions with larger cells will often contain smaller number of rows of cells than the regions with smaller cells. Thus, in the specific example shown in FIG. 3A, the regions 303, 305, and 307, have widths of 8 rows, 7 rows and 6 rows respectively. In general, the alternating distinct regions of the matrix need not necessarily be formed as extending along rows or columns of the display structure. For example, in other embodiments, alternating regions may have a variety of other shapes, such as alternating triangules, hexagons, or rectangles and arranged in any form that is suitable for a particular application of a display.

Referring again to an embodiment shown in FIG. 3A, the cells of the matrix within each region are fluidly connected by a plurality of channels, which allow dielectric fluid to flow freely between the cells of an individual region. Adjacent regions of the matrix are separated by a matrix wall, which does not allow for fluid communication between the regions. Such arrangement is preferred in some embodiments, because failure of one region (e.g., contamination of dielectric fluid in one region) would not lead to failure of an adjacent regions or failure of the entire display because of the protection provided by the matrix wall.

Figure 3B:
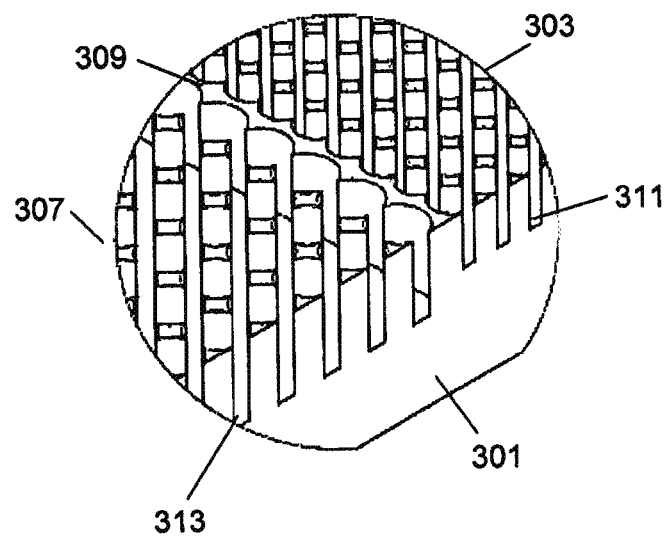
FIG. 3B shows a close-up view of a junction between two regions of a matrix having different-size cells.

A close up view of a junction L between a region with large cells, 307, and a region with small cells 303 is shown in FIG. 3B. The separating wall 309 between regions 307 and 303 can be seen in this view. It can be seen that individual cells 311 and 313 of each region of the matrix are formed by a plurality of posts (pillars), and that the cells within each region are in fluid communication with one another. A distinctive feature of this matrix design is that cells 313 and 311 not only have different diameters, but also have different depths. Thus, cell 311, designed to hold smaller spheres than cell 313, is less deep than cell 313. Such design will minimize the translational movement of smaller spheres within their cells. In other embodiments, cells of substantially equal depths may be used in different regions, and translational movement of smaller spheres is acceptable.

Figure 3C:
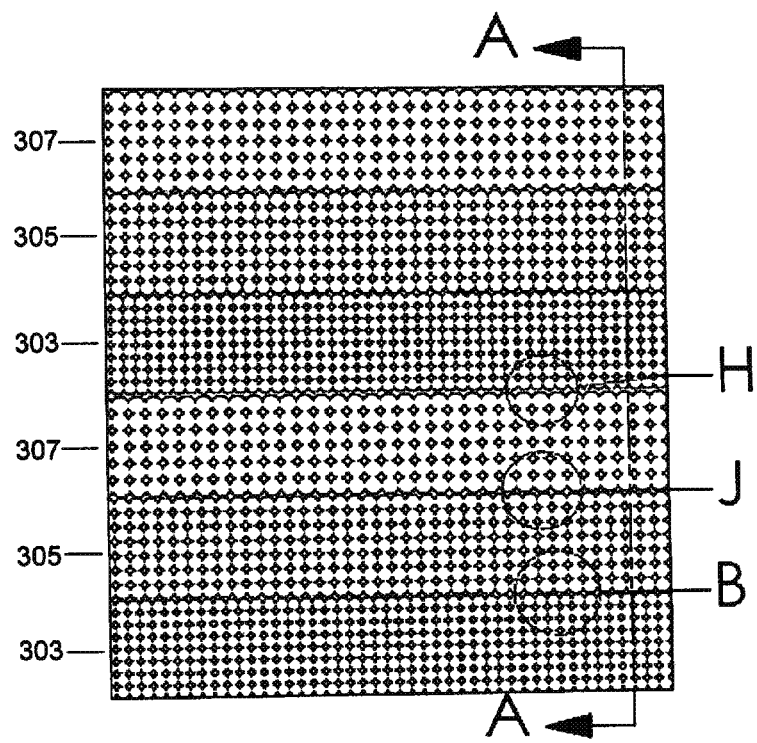
FIG. 3C shows a top view of a matrix structure having three alternating regions of different-size cells.

FIG. 3C shows a top view of the matrix portion shown in FIG. 3A. The alternating dissimilar matrix regions 303, 305, and 307 are seen, where the region of small cells 303 is adjacent to the region of medium cells 305 on one side and to the region of large cells 307 on the opposite side. In all three regions the cells of the matrix in the illustrated embodiment are arranged in close square pack. In general, the cells of the matrix can be arranged in a variety of geometries, and need not necessarily be in the same arrangement in each region. Close pack arrangements, in which the area of matrix walls projected onto viewable plane of the display is minimized, are preferred in many embodiments. For example, in some embodiments, hexagonal close packing of cells is used. A number of suitable matrix designs configured for holding one element per cell, are described in the co-owned US Application Publication No. 2008/0100907 which was previously incorporated by reference. Further, in some embodiments, although not necessarily, optical properties of the matrix, e.g., high reflectivity of a light or white matrix, can be used to create a brighter display, such as described in US Application Publication No. 2008/0100907 previously incorporated by reference. Thus, in some embodiments, the viewable portions of matrix walls (e.g., posts seen in FIG. 3C) are opaque white.

Figure 3D:
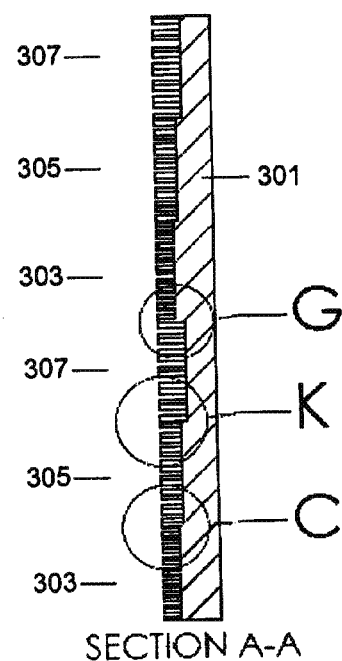
FIG. 3D-3J show top and side cross-sectional views of various matrix details.

FIG. 3D shows a cross-sectional view of the matrix portion, illustrating section A-A indicated on the top view shown in FIG. 3C. Dissimilar regions of cells 303, 305, and 307, where dissimilar cells extend into the matrix base 301 to different depths can be seen.

FIGS. 3E-3J show various details of the matrix and provide specific dimensions for matrix features in accordance with one illustrative embodiment. This specific matrix is designed to hold three populations of optically and dimensionally dissimilar spheres, illustrated in FIG. 4: a population of small spheres 405 with diameter in the range of about 45-53 μm, a population of medium spheres 403 with diameter in the range of about 59-63 μm, and a population of large spheres 401 with diameter in the range of about 69-75 μm. For example, small red-and-white, medium green-and-white, and large blue-and-white spheres might be used. Of course, red-and-white spheres need not necessarily be the smallest, and a particular optical combination can be matched to any size, as convenient. It is understood, that sphere sizes and matrix cell sizes can be scaled to smaller or larger ranges, as desired for a particular display resolution, as long as the general principles of Optical-Dimensional matching are fulfilled. Specifically, dissimilar populations of the spheres should not have overlapping diameters, and, preferably, the size distribution within one population should be as narrow as possible. Sieving techniques can be used to provide populations of spheres with suitable size distributions. Further, the matrix and the rotating elements are designed such that the largest rotating elements would physically fit only into the largest cells, while medium elements would only fit into medium and largest cells, but not into the smallest cells. Typically the diameter of the smallest cell is smaller than the diameter of medium and largest spheres, while the diameter of medium cell is smaller than the diameter of the largest spheres.

Figure 3E:
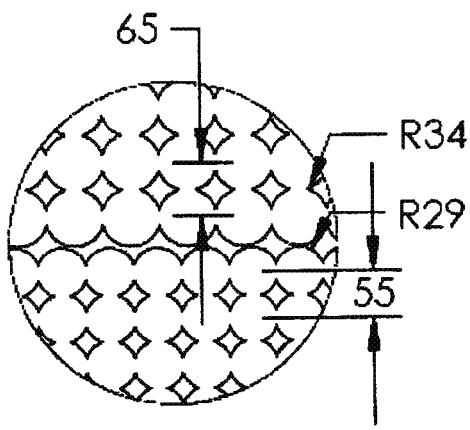
Figure 3F:
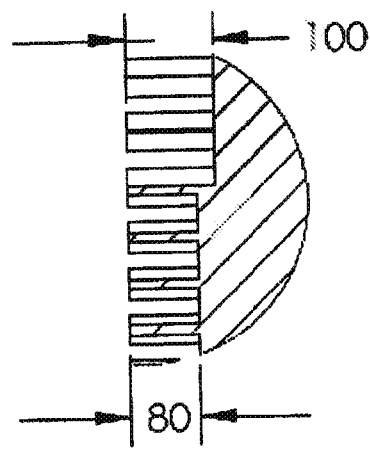

Referring to FIG. 3E, a top detailed view of a junction between the region of small cells 303 and the region of medium cells 305 is shown. The diameter of the small cell is about 58 μm, allowing it to host only the smallest spheres having a diameter in the range of about 45-53 μm. The diameter of the medium cell is about 65 μm, allowing it to host medium spheres but not the large spheres. FIG. 3F illustrates a cross-sectional view of the same junction between the region of small cells 303 and the region of medium cells 305. The small cells have a depth of about 80 μm, while the medium cells have a depth of about 100 μm.

Figure 3G:
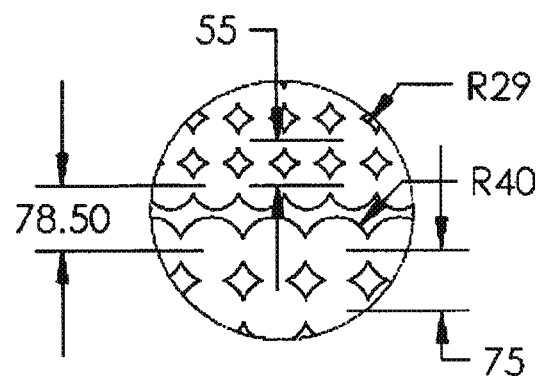
Figure 3H:
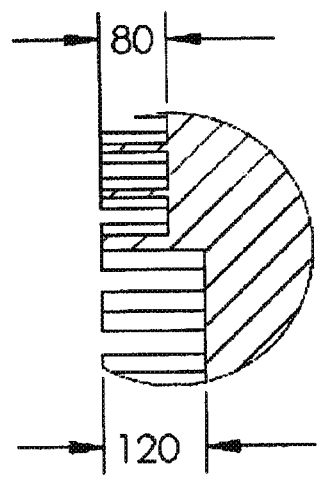

FIGS. 3G and 3H illustrate respectively a top view and a cross-sectional view of a junction between a region of small cells 303 and a region of large cells 307. Referring to FIG. 3G, it can be seen that the diameter of a small cell is about 55 μm, while the diameter of a large cell in the adjacent region is about 75 μm. Referring to the cross-sectional view shown in FIG. 3H, the depth of the large cell is about 120 μm, while the depth of a small cell in an adjacent region is about 80 μm.

Figure 3I:
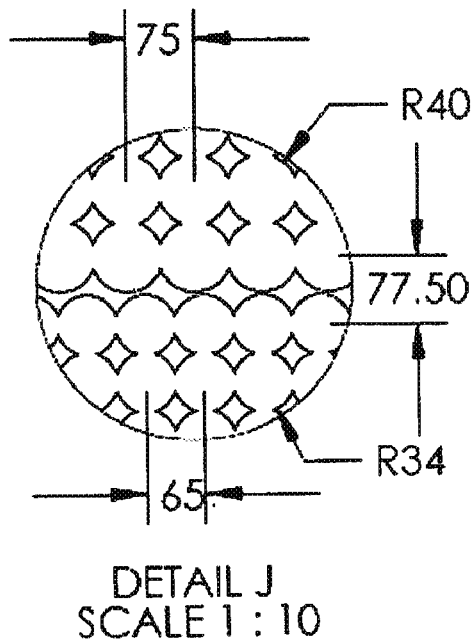
Figure 3J:
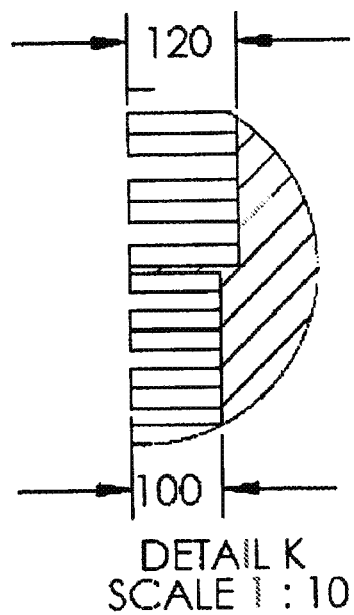

Similarly, FIGS. 3I and 3J illustrate respectively a top view and a cross-sectional view of a junction between a region of medium cells 305 and a region of large cells 307. Referring to FIG. 3J, it can be seen that the diameter of a medium cell is about 65 μm, while the diameter of a large cell in the adjacent region is about 75 μm. Referring to the cross-sectional view shown in FIG. 3H, the depth of the large cell is about 120 μm, while the depth of a medium cell in an adjacent region is about 100 μm.

Because of matching between the cell size, the element size, and element's optical properties, manufacturing of Optically-Dimensionally Matched REDs is surprisingly facile, allowing for efficient fabrication of ordered optically-dissimilar arrays.

Figure 5:
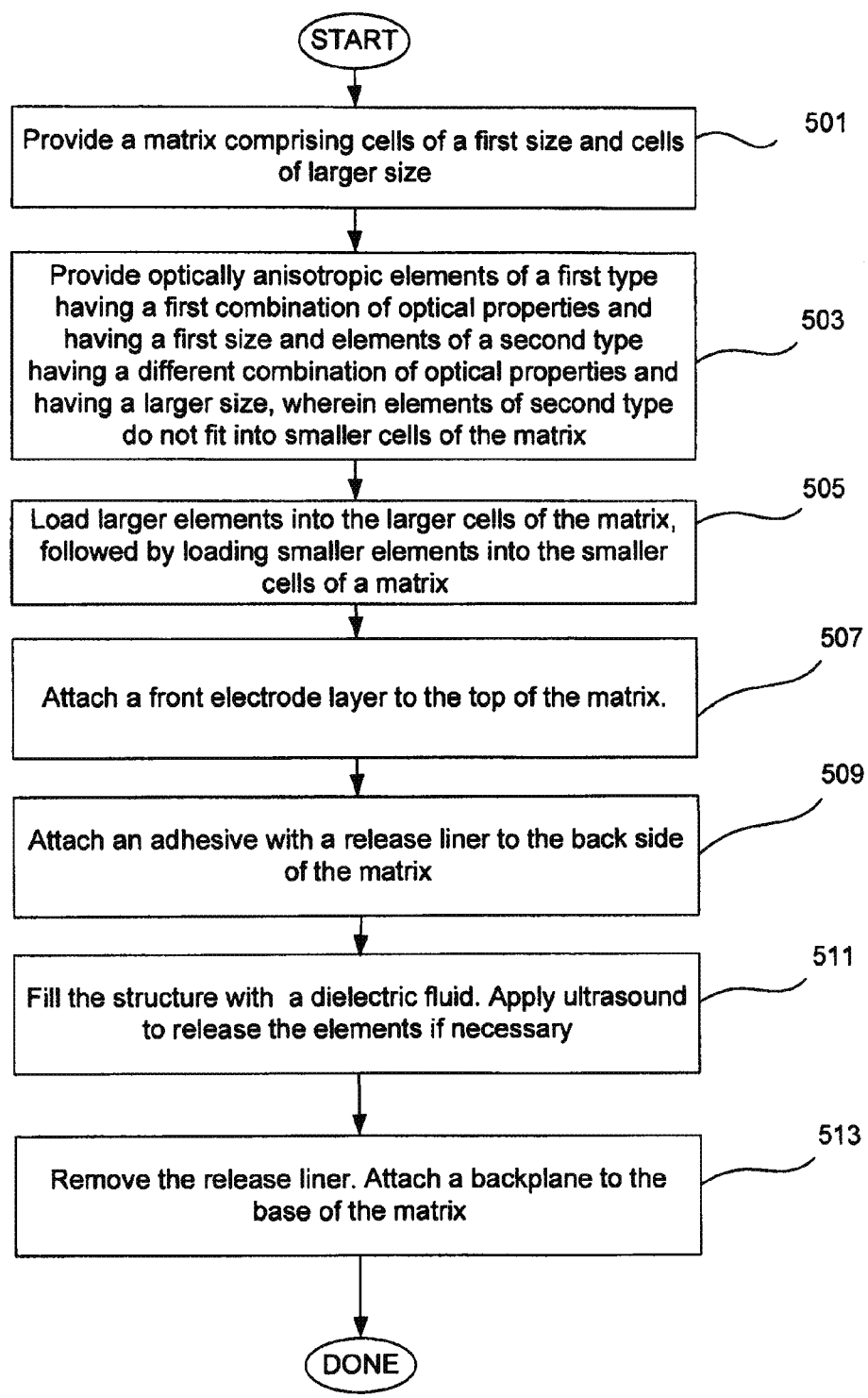
FIG. 5 shows a process flow for manufacturing an Optically-Dimensionally Matched RED, in accordance with one embodiment.

FIG. 5 illustrates one suitable process flow for a method of fabrication of an Optically-Dimensionally matched RED.

The process starts in operation 501, which provides a matrix comprising cells of a first size and cells of larger size. For example, matrices having regions of 2, 3, 4, or 5 distinct cell sizes may be provided. In many embodiments, a matrix containing three types of cells that are organized in alternating regions is sufficient for providing a full-color display. In other embodiments, matrices having only two distinct types of cells configured to host two types of optically dissimilar elements are employed. The described matrices can be manufactured by a variety of methods, including but not limited to embossing a suitable matrix from a polymeric material using a master mold. A master mold of a specific design can be manufactured, for example, by machining methods.

Operation 503 provides the rotating elements that are matched in size with the distinct cells of the matrix. Thus, optically anisotropic elements of a first type have a first combination of optical properties and a first size, while elements of a second type have a different combination of optical properties and have a larger size. The elements and the matrix are specifically matched such that the larger elements of a second type do not fit into smaller cells of the matrix. Populations of elements having distinct sizes and distinct optical properties are obtained, in some embodiments, by hemispherically coating commercially available elements of different sizes with different-color coatings.

Once the matrix and the matching rotating elements are provided, the loading operation 505 begins, in which the larger elements are loaded into the matrix first, followed by smaller elements, whereby the largest elements occupy the largest cells of the matrix, and the smallest elements occupy the smallest cells of a matrix. If more than two types of elements and cells are used, loading is performed in the order of decreasing element size, starting with the largest elements and ending with the smallest elements. The elements can be loaded for example, by distributing a plurality of elements having same size over the surface of the matrix which comprises open cells. The distribution is performed in some embodiments by the following method. First, a slurry of a first population of spheres in a fluid is prepared. For example the same dielectric fluid which will later be used to fill in the cells may be employed to minimize contamination. Next, an absorbent member (e.g., a brush) is loaded with the slurry of the spheres and is then transferred to the top of the matrix and brought into contact of with the matrix. The absorbent member moves against the matrix and loads the spheres into the matrix cells. Next, excess spheres are removed from the top of the matrix by a second absorbent member (e.g., another brush), which wipes the excess spheres off. Next, a slurry of the next population of spheres (smaller spheres) is loaded onto another absorbent member, and the process is repeated. The loading proceeds in this manner, until all populations of spheres are loaded into the cells, and the matrix is filled. After loading is completed, the matrix filled with the elements, where one element resides in each cell, and where elements are matched with the corresponding cells of their size, results.

In the operation 507, a front electrode layer (e.g., ITO-coated PET) is attached to the top of the matrix. In one embodiment the front electrode is attached using heat-activated adhesive. This procedure and other details of RED assembly that can be applied for fabrication of color REDS described herein, are described in the US Patent Application Publication 2008/0100907, which was previously incorporated by reference.

An adhesive with a release liner is attached to the back side of the matrix in operation 509 at this point or at any other suitable point in the process. After the front electrode had been attached to the matrix, the structure is filled with a dielectric fluid in operation 511, e.g., by creating a vacuum within the structure and drawing the dielectric fluid in to the structure through open channels of the matrix. The matrix is then sealed, and, optionally, ultrasound is applied to release the elements within individual cells, to ensure that the elements do not stick to matrix walls and are fully rotatable.

Finally, in operation 513, the structure is attached to the backplane of the display, by, for example, removing the release liner and attaching the backplane to the base of the matrix using pressure-activated adhesive.

The backplane contains a plurality of electrodes disposed in two dimensions, where each electrode is configured to control a portion of the display. The electrodes are matched with specific areas of the matrix allowing addressable control of rotatable elements. In one embodiment, different electrodes are configured to control different types of rotating elements disposed within the matrix. For example, three individual electrodes may be needed to control and selectively address regions populated with red-and-white, green-and-white, and blue- and white spheres respectively. In another embodiment, one electrode is used to control and to individually address adjacent regions of distinct rotatable elements, by using different addressing signals. For example, one electrode may address a portion of display containing small red-and-white, medium green-and-white, and large blue- and white spheres, and may provide different signals for rotating distinct elements. For example, in one embodiment, smaller elements will require smaller threshold voltage for rotation, while medium elements will require medium threshold voltage, and large elements will require large threshold voltage, thereby allowing for selective addressing of distinct elements using one electrode. In other embodiments, dissimilar elements may be configured to respond differently to different waveform signals, magnetic signals, etc.

Background-Assisted Color REDs

In a separate aspect, a background-assisted color RED is provided. The display uses at least one background color member, e.g., a colored film, disposed behind a transparent matrix to create a desired visual effect. It was unexpectedly discovered that placement of a color background member behind a transparent matrix containing a homogeneous population of black-and-white spheres results in the appearance of a color display.

For example, placement of a red background member behind a clear matrix populated by black-and-white spheres, results in a red-and-white display appearance. Placement of a green background member will result in a green-and-white display, while placement of a blue background member will result in a blue-and-white display. In general, a variety of background member colors can be used to provide a custom display color, as desired. It is preferred, that the color background member has high saturation. In some embodiments saturation of 50% and greater is preferred.

While in many embodiments the background member is used to supply the requisite color to the color display, in some embodiments a white background member or a black background member is used to obtain a display with an improved contrast.

Figure 6:
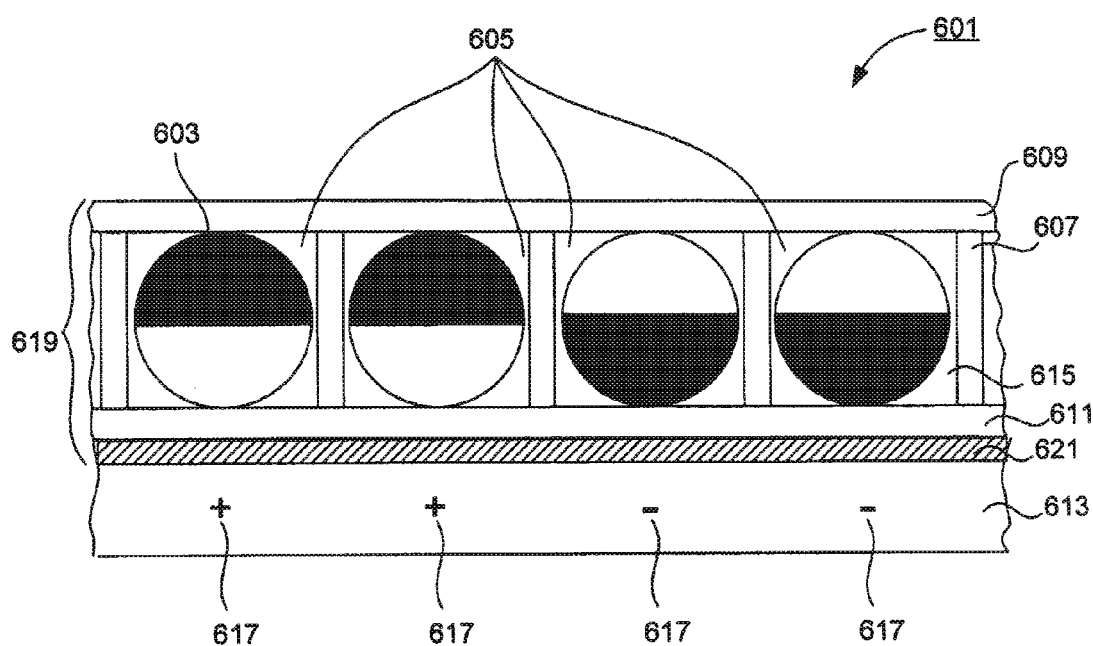
FIG. 6 shows a cross-sectional view of a Background-Assisted Color RED in accordance with an embodiment provided herein.

A cross-sectional schematic depiction of a Background-Assisted RED in accordance with one embodiment is shown in FIG. 6. Black-and-white rotatable spheres 603 reside in cells 605 of a transparent container matrix 607, and are viewable through a transparent electrode layer 609 that is disposed on one side of the container matrix. The spheres are suspended in dielectric fluid 615 and can be addressably rotated in response to electromagnetic signals provided by electrodes 617 disposed in two dimensions on the backplane 613. A continuous background member 621 resides between the backplane 613 and the transparent base of the matrix 611 and is viewable through the transparent front electrode 609 and the transparent matrix 607. The background member 621, together with the matrix 607, and the front electrode 609 form the front plane of the display. Because it is preferable to minimize the driving voltage for rotation of the spheres, the background member is typically selected to be relatively thin. In some embodiments the thickness of the background member is less than about 100 μm, preferably less than about 20 μm, such as between about 5 and about 10 μm. Paper or polymeric films, such as PET and mylar films are examples of materials that are suitable for background members.

In other embodiments, the base of the matrix serves as a background color member, and a separate background film need not be introduced between the backplane and the matrix. In this embodiment, the base of the matrix is not transparent and is typically opaque and colored with a desired color, having high saturation. The walls of the matrix, however, are transparent, allowing the matrix base to be viewable to the display user.

In the embodiment depicted in FIG. 6, the background member has macroscopic dimensions and resides behind a large plurality of matrix cells. In some embodiments where the backplane electrode is transparent, the background member may reside behind the backplane electrode. In some embodiments, the area of the background member is substantially equal to the entire area of the display. In general, the background member need not necessarily have one solid color. In some embodiments, the background member will include an image or a pattern. In some embodiments a plurality of background members will be disposed in the display such as to create an image or a pattern.

In another embodiment, a plurality of background members having different colors are arranged in alternating regions having relatively small dimensions, allowing for color mixing and providing a larger color gamut, e.g., providing a multi-display. In one implementation, each background color member resides behind between about 1-50 rows of cells, such as between about 2-20 rows of cells and has a length equal to the length of a display. Background color members having different colors alternate in the background creating display regions having different color properties. The regions having different colors may be addressed using separate electrodes disposed on the backplane, or alternatively more than one region may be controlled with the same electrode.

Figure 7:
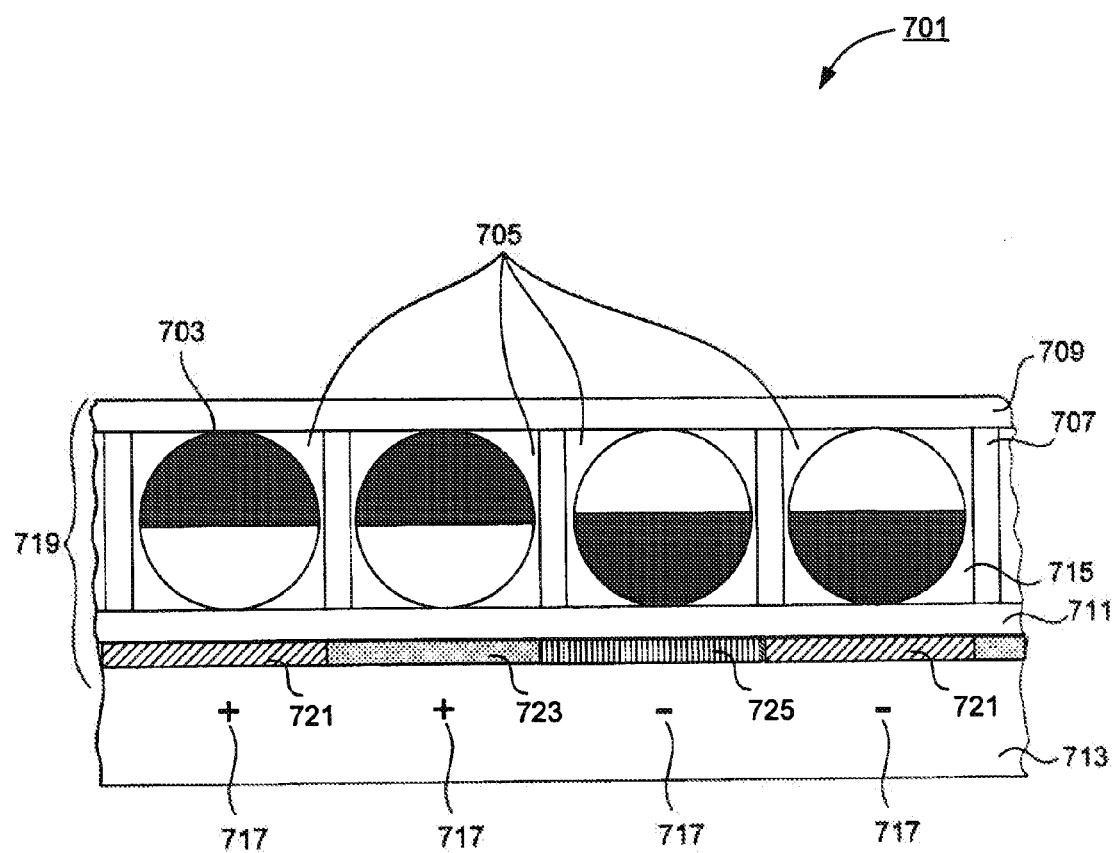
FIG. 7 shows a cross-sectional view of a Background-Assisted Color RED in accordance with another embodiment provided herein.

A schematic cross-sectional view of a display structure in accordance with this embodiment is shown in FIG. 7. The display features are numbered analogously to the display features shown in FIG. 6. Three distinct alternating background members 721, 723, and 725 are shown, where each background member resides behind one row of cells. In a specific embodiment an RGB display is provided, where the three distinct background color members are opaque red, green and blue having high saturation. A plurality of electrodes are aligned on the backplane in register with different-color regions, allowing for addressable flipping of spheres in the desired regions, as needed to create a color image.

The Background-Assisted REDs can be easily manufactured and can be used with homogeneous populations of black-and-white rotatable elements. It is understood that in other embodiments a variety of optically anisotropic elements may be used in Background-Assisted REDs to create visual effects that are needed for desired applications and that Background-Assisted REDs are not limited to use of black-and-white spheres exclusively. In addition, Background-Assisted REDs can be used in conjunction with Multi-Color REDs and Optically-Dimentionally Matched RED described here.

Figure 8:
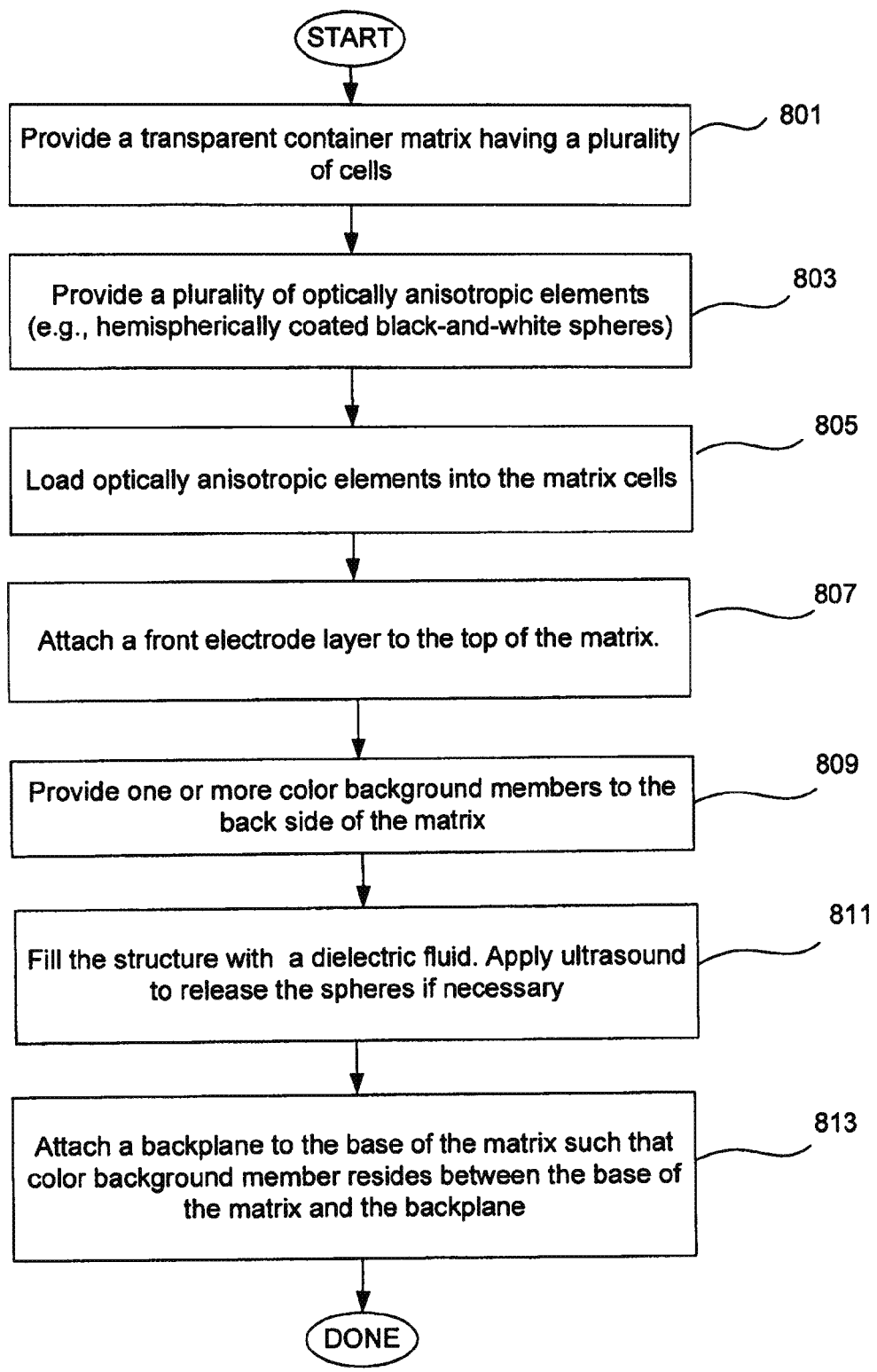
FIG. 8 shows an illustrative process flow for manufacturing a Background-Assisted RED, in accordance with some embodiments provided herein.

An illustrative process flow diagram for manufacturing a background-assisted color RED is shown in FIG. 8. In operation 801, a transparent container matrix having a plurality of cells is provided. The optical properties and the dimensions of the matrix are selected such as to make background color viewable through the walls of the matrix. In 803 a plurality of optically anisotropic elements (e.g., hemispherically coated black-and-white spheres) is provided. Next, in 805, the optically anisotropic elements are loaded into the matrix cells, and, in 807, a front electrode layer is attached to the top of the matrix. In 809 one or more color background members are provided to the back side (base) of the matrix. In 811 the structure is filled with a dielectric fluid. Finally, in 803, a backplane is attached to the base of the matrix such that the color background member resides between the base of the matrix and the backplane, and such that the background color is viewable to the display viewer.

The manufacturing process operations need not necessarily be performed in the sequence shown in FIG. 8. Some of the depicted operations may be performed at different times, without interfering with the process flow. For example, a wide latitude exists for the timing of introducing the background color member. The background color member can be provided to the matrix as early in the process as operation 801, in which the matrix is provided, or it can be provided as attached to the matrix or the backplane as late in the process as operation 813, or at any suitable time between these operations. In some embodiments, the background member is attached to the matrix and the backplane with an adhesive, such as with pressure-activated adhesive and the like.

Matrix-Assisted Color REDs with Color Filters

In another implementation, a color RED uses a matrix that has a white or light viewable portion, an array of optically anisotropic elements disposed in the matrix cells (e.g., a population of black-and-white spheres) and transmissive color filters disposed on the viewable side of the matrix. A suitable white or light matrix that can be used in this implementation is described in detail in US Application Publication No. 2008/0100907 previously incorporated by reference. High reflectivity of the matrix provides for a substantially brighter display than, for example a conventional gyricon display equipped with color filters.

Figure 9:
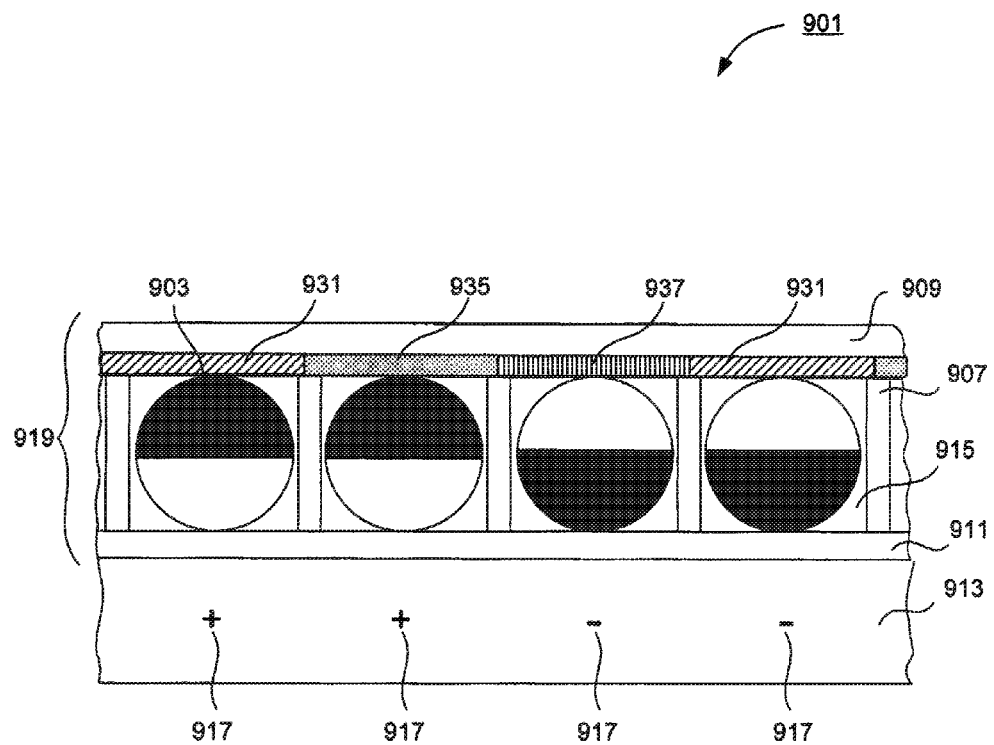
FIG. 9 shows a cross-sectional view of a Matrix-Assisted Color RED with Color Filters in accordance with one embodiment provided herein.

An illustrative schematic cross-sectional depiction of an RED display with color filters, in accordance with one embodiment is provided in FIG. 9. In this embodiment a plurality of black-and-white spheres 903 reside in the cells of a matrix that has highly reflective, e.g., white, viewable portions. A plurality of color filters 931, 935, and 937 are disposed between the matrix and the front electrode layer 909. For example alternating red, green, and blue color filters may be used. In the illustrated embodiment, each color filter resides over one row of cells and extends for the entire length of the display. In other embodiments, each color filter may reside over 1-50 rows of cells, e.g., 2-20 rows of cells. Further it need not necessarily extend for the entire length of the display column. Alternating rectangles, triangles, hexagons, and other geometries covering the display are may also be used.

An RGB display can be formed by using such color filters. Electrodes 917 are disposed on the backplane of the display in register with regions covered by distinct color filters, such that a "red electrode" can address a red subpixel, a "green electrode" can address a green subpixel and "blue electrode"

can address blue subpixel by providing a requisite stimulus to flip a sphere or spheres disposed under red, green, and blue color filters respectively.

Other Embodiments

It is understood that the examples and embodiments described herein are for illustrative purposes only and that various modifications or changes in light thereof will be suggested to persons skilled in the art. Although various details have been omitted for clarity's sake, various design alternatives may be implemented. Therefore, the present examples are to be considered as illustrative and not restrictive, and the invention is not to be limited to the details given herein, but may be modified within the scope of the appended claims.

For example, while it is advantageous for some applications that provided color REDs possess bistability, in other embodiments (e.g., in embodiments directed to video applications), the displays of present invention may not necessarily be bistable. Further, the invention is not limited to specific colors and combinations of colors provided in the examples, and may employ a wider variety of colors and other optical properties, to provide desired visual effects while following the principles illustrated above.

Even though most of the examples describe reflective displays; transmissive displays can also be manufactured using disclosed techniques by using transmissive materials for the matrix and utilizing rotating elements that are at least partially transmissive. Typically microspheres with two segments are preferred due to their robustness and uniform smooth surface. However, rotating elements of other shapes and more than two segments can be similarly used to build multi-color rotating elements displays based on the same principles.

Preferred matrix structure contains tightly packed monolayer of rotating elements where each element is in its own cavity. However, for applications where high brightness and low operating voltage are not critical, other types of matrix structures may also be used, such as multiple-layer structures and structures with more than one element per cavity. The advantages of the described techniques based on combining several distinct types of rotating elements to produce a multi-color display with simplified driving mechanism and straightforward low cost manufacturing process will still apply to those devices.

Further, while in some aspects and embodiments of the present invention it is advantageous to use sets of elements that vary in electromagnetic response, other embodiments might function as well with just one type of microspheres, or several types that vary only in size or optical characteristics.

What is claimed is:

1. A multi-color rotating element display comprising:
(a) a back plane comprising a plurality of electrodes distributed in two dimensions on the backplane, wherein each electrode allows control of a discrete region of the display; and
(b) a front plane comprising:
a first side connected to or proximate said back plane;
at least one electrode on a second side of the front plane opposite said back plane;
a matrix comprising a plurality of cells in a tightly packed monolayer arrangement, wherein the matrix is not a plastisizable elastomer, and wherein the matrix is a container configured for hosting a plurality of rotable elements in a single layer in said monolayer of cells;
the plurality of rotatable elements disposed in the matrix cells in a single layer, wherein the rotatable elements are of more than one type, and wherein rotatable elements of a first type have optical properties and electromagnetic response properties that are distinct from optical properties and electromagnetic response properties of rotatable elements of the second type wherein the distinct optical properties are selected from the group consisting of distinct colors, distinct diffuse reflection properties, distinct specular reflection properties, distinct retroreflection properties distinct light-emission properties and distinct luminescence properties, and wherein the distinct electromagnetic response properties are selected from the group consisting of distinct rotational responses of the elements to a specific voltage, distinct rotational responses of the elements to a specific frequency, and distinct rotational responses of the elements to a specific waveform;
a fluid provided in said cells, such that said elements can rotate from a first orientation to a second orientation within their respective cells when an electromagnetic field is applied to the cells.

2. A display of claim 1, wherein the rotatable elements are opaque hemispherically coated spheres.

3. A display of claim 2, wherein the rotatable elements of different types comprise cores selected from the group consisting of glass cores, polymer cores, and ceramic cores.

4. A display of claim 2, wherein the rotatable elements of different types comprise coatings that impart optical and electrical anisotropy to the rotatable elements.

5. The display of claim 2, wherein each type of the rotatable elements comprises a hemisphere having a white color.

6. The display of claim 1, wherein the matrix color is white.

7. The display of claim 1, wherein the display is a reflective display.

8. A rotating element display comprising:
(a) a back plane comprising a plurality of electrodes distributed in two dimensions on the backplane, wherein each electrode allows control of a discrete region of the display; and
(b) a front plane comprising:
a first side connected to or proximate said back plane;
at least one electrode on a second side of the front plane opposite said back plane;
a matrix comprising a plurality of cells in a tightly packed monolayer arrangement, wherein the plurality of cells comprise a plurality of cells of a first type and a plurality of cells of a second type, wherein cells of the first type are smaller than the cells of the second type, wherein the matrix is a container configured for hosting a plurality of optically anisotropic elements in a single layer in said monolayer of cells and wherein the matrix is not a plastisizable elastomer;
the plurality of optically anisotropic elements comprising a plurality of elements of a first type and a plurality of elements of a second type disposed in said plurality of cells in a single layer such that the optically anisotropic elements of the first type occupy only cells of the first type and the optically anisotropic elements of the second type occupy only cells of the second type, wherein optically anisotropic elements of the first type are smaller than the optically anisotropic elements of the second type and wherein the optically anisotropic elements of the first type have optical properties and electromagnetic response properties that are distinct from optical properties and electromagnetic response properties of the optically anisotropic elements of the second type, wherein the distinct optical properties are selected from the group consisting of distinct colors, distinct diffuse reflection properties, distinct specular reflection properties, distinct retroreflection properties, distinct light-emission properties and distinct luminesence properties, and wherein the distinct electromagnetic response properties are selected from the group consisting of distinct rotational responses of the elements to a specific voltage, distinct rotational responses of the elements to a specific frequency, and distinct rotational responses of the elements to a specific waveform; and a fluid provided in said cells, such that said elements can rotate from a first orientation to a second orientation within their respective cells when an electromagnetic field is applied to the cells.

9. The display of claim 8, wherein the optically anisotropic elements are opaque hemispherically coated spheres.

10. The display of claim 8, further comprising a plurality of cells of a third type, and a plurality of optically anisotropic elements of a third type, wherein the optically anisotropic elements of the third type comprise at least one optical property that is different from that of the optically anisotropic elements of the first type and the second type, and wherein the optically anisotropic elements of the third type occupy only the cells of the third type, said cells of the third type being larger than the cells of the second type.

11. The display of claim 8, wherein elements of the second type do not physically fit into the cells of the first type.

12. The display of claim 8, wherein the display is a reflective display.

13. A rotating element display comprising:
(a) a back plane comprising a plurality of electrodes distributed in two dimensions on the backplane, wherein each electrode allows control of a discrete region of the display; and
(b) a front plane comprising:
a first side connected to or proximate said back plane;
at least one background color member adjacent the first side of the front plane, said background color member having a background color on its viewable side;
at least one electrode on a second side of the front plane opposite said back plane;
a transparent matrix comprising a plurality of cells arranged in a monolayer in the matrix, wherein the matrix permits the background color member to be viewable through its transparent walls and wherein the matrix is not a plastisizable elastomer;
a plurality of optically anisotropic elements disposed in a single layer in said a monolayer of cells, wherein the optically anisotropic elements are of more than one type, and wherein the optically anisotropic elements of the first type have optical properties and electromagnetic response properties that are distinct from optical properties and electromagnetic response properties of the optically anisotropic elements of the second type, wherein the distinct optical properties are selected from the group consisting of distinct colors, distinct diffuse reflection properties, distinct specular reflection properties, distinct retroreflection properties, distinct light-emission properties and distinct luminescence properties, and wherein the distinct electromagnetic response properties are selected from the group consisting of distinct rotational responses of the elements to a specific voltage, distinct rotational responses of the elements to a specific frequency, and distinct rotational responses of the elements to a specific waveform and
a fluid provided in said cells, such that said elements can rotate from a first orientation to a second orientation within their respective cells when an electromagnetic field is applied to the cells.

14. The display of claim 13, wherein the one or more background color member comprises an image or a pattern.

15. The display of claim 13, wherein the optically anisotropic elements are opaque hemispherically coated spheres.

16. The display of claim 13, wherein the background color member resides behind the optically anisotropic elements.

17. The display of claim 13, wherein the background color is black or white.

18. The display of claim 13, wherein the background member comprises a colored film.

19. The display of claim 13, wherein the background member resides between a base portion of the matrix and the backplane.

20. The display of claim 13, comprising a plurality of background color members.

* * * * *